Figure 5:
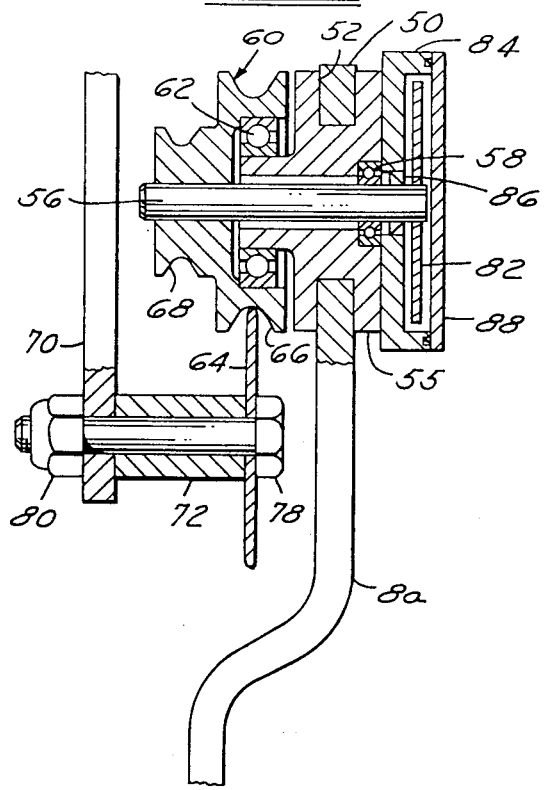

United States Patent [19]

Brems et al.

[11] 4,316,535
[45] Feb. 23, 1982

[54] WORKPIECE STORAGE SYSTEM

[75] Inventors: John H. Brems; James T. Graham, both of Birmingham, Mich.

[73] Assignee: F. Jos. Lamb Company, Warren, Mich.

[21] Appl. No.: 176,562

[22] Filed: Aug. 8, 1980

Related U.S. Application Data

[63] Continuation of Ser. No. 908,941, May 24, 1978, abandoned.

[51] Int. Cl.³ .............................................. B65G 37/00
[52] U.S. Cl. .................................... 198/473; 104/127; 105/150; 188/290
[58] Field of Search ............... 198/339, 347, 472, 473, 198/580, 560, 648; 104/89, 93, 127, 128; 105/148, 150; 188/267, 290

[56] References Cited

U.S. PATENT DOCUMENTS

| | | | |
|---|---|---|---|
| 618,396 | 1/1899 | Cowles | 104/127 |
| 2,312,188 | 2/1943 | Patz | 105/150 |
| 2,832,298 | 4/1958 | Ambli | 105/150 |
| 4,098,375 | 7/1978 | Kornylak | 188/290 |
| 4,215,772 | 8/1980 | Graham | 188/290 |

Primary Examiner—Joseph E. Valenza
Attorney, Agent, or Firm—Barnes, Kisselle, Raisch & Choate

[57] ABSTRACT

For use in a work processing line for workpieces, a workpiece storage system including a topologically closed loop track means having downwardly sloping surfaces coupled with elevators and lowerators in the loop, and work holding, gravity-operated pallets to run on said tracks having track engaging wheels equipped with retarding means responsive to wheel angular velocity and utilizing wheels of different diameters on the track depending on the loaded or unloaded condition of the pallets to control the speed of the pallets. Auxiliary track means, pallet loaders and unloaders, and switching mechanisms are incorporated in the system with elevators and lowerators to allow the storage system to function between multiple work processing lines, between single and multiple lines or between multiple and single lines to increase the flexibility of a work processing activity and reduce downtime.

5 Claims, 53 Drawing Figures

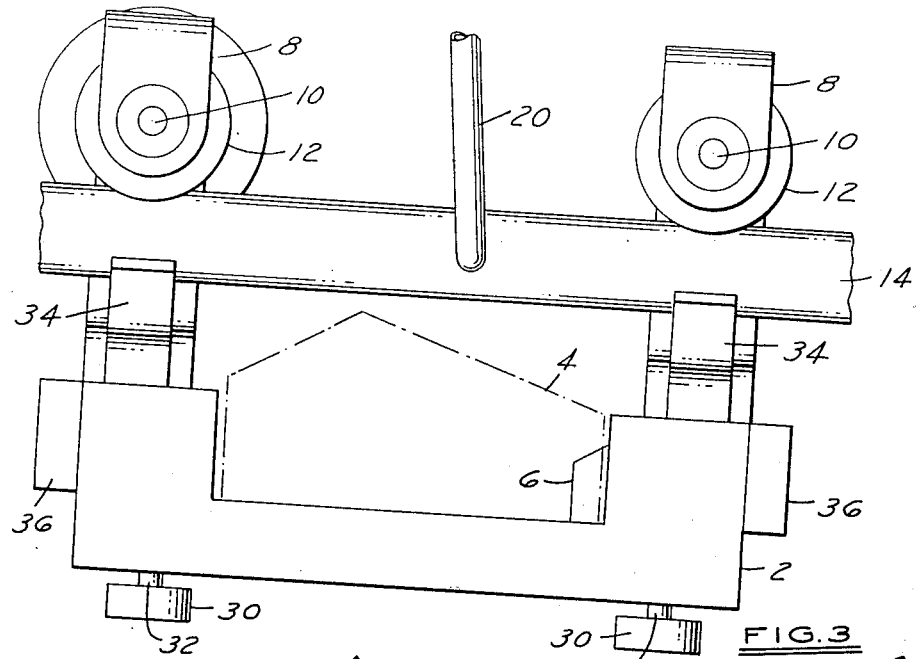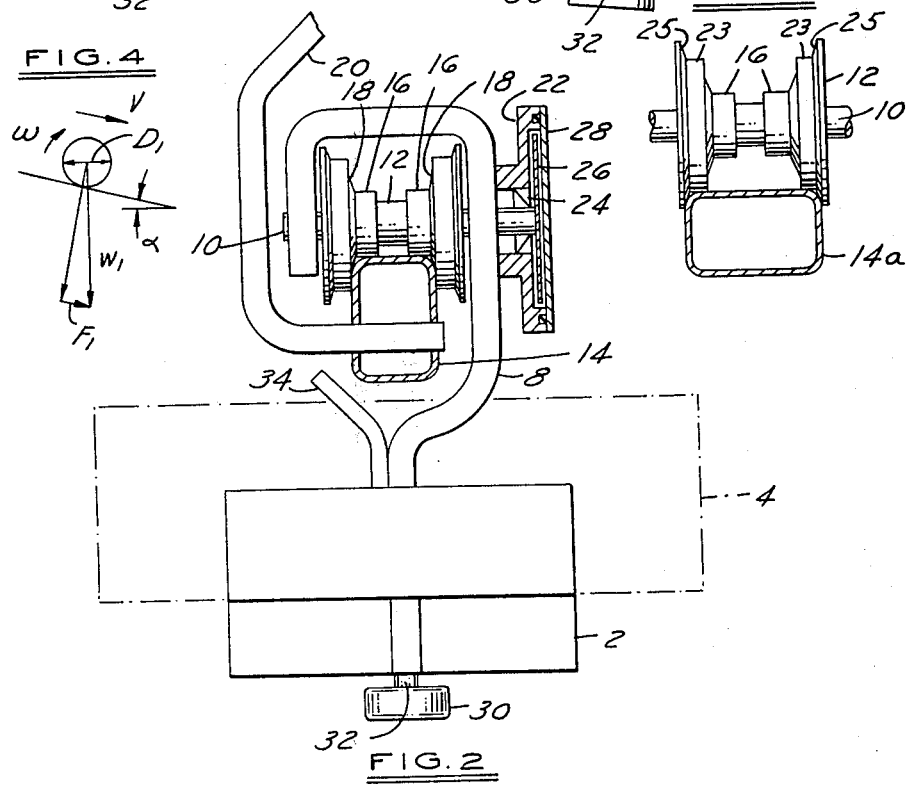

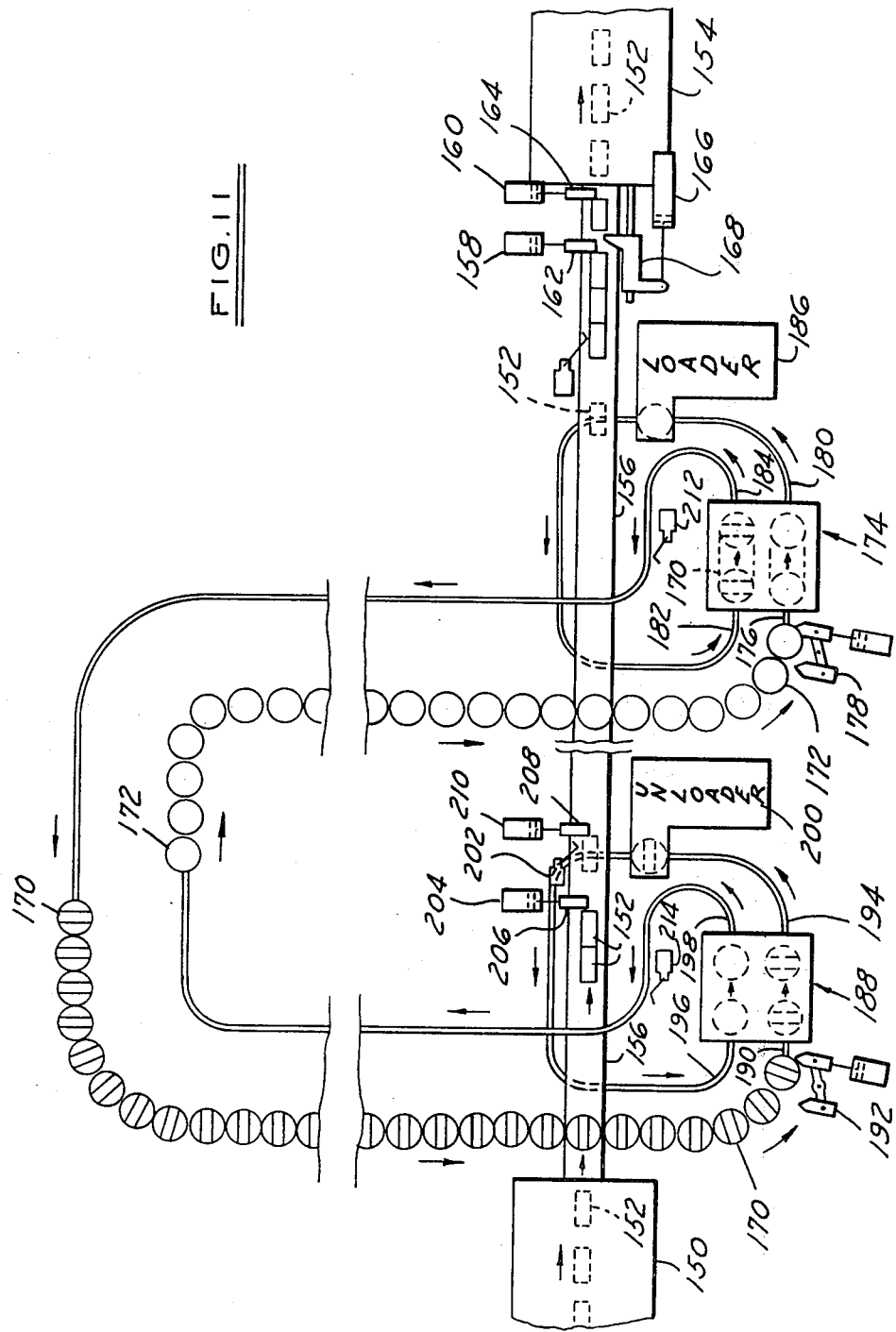

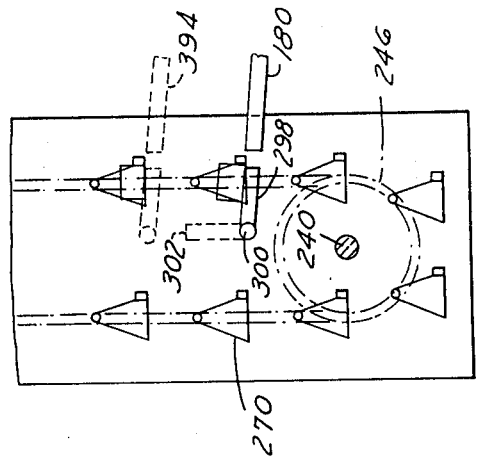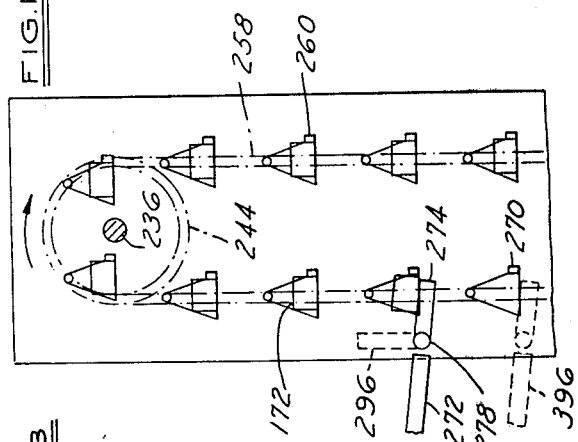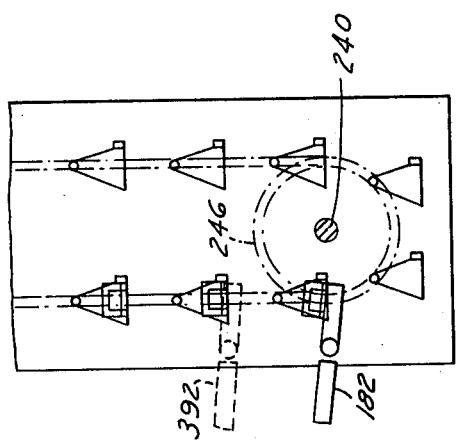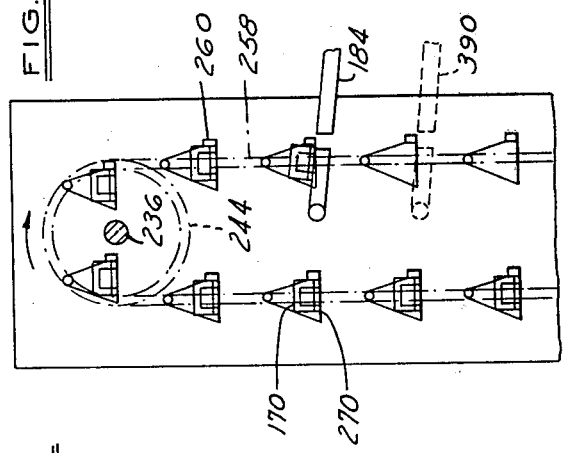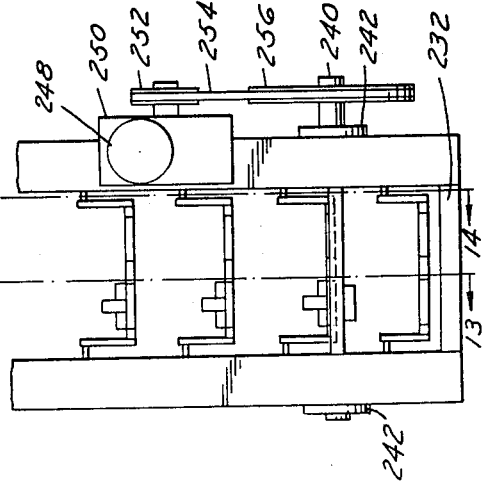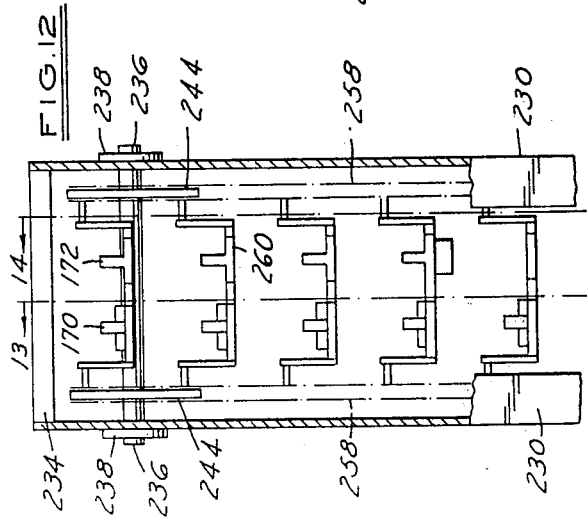

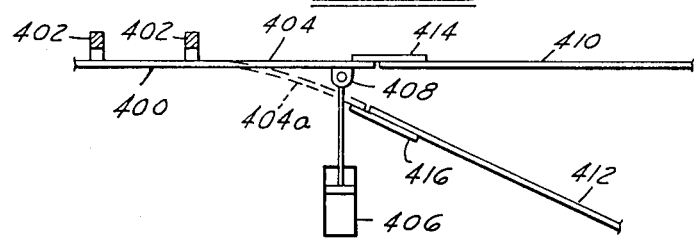
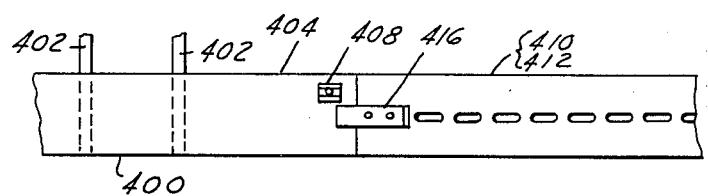
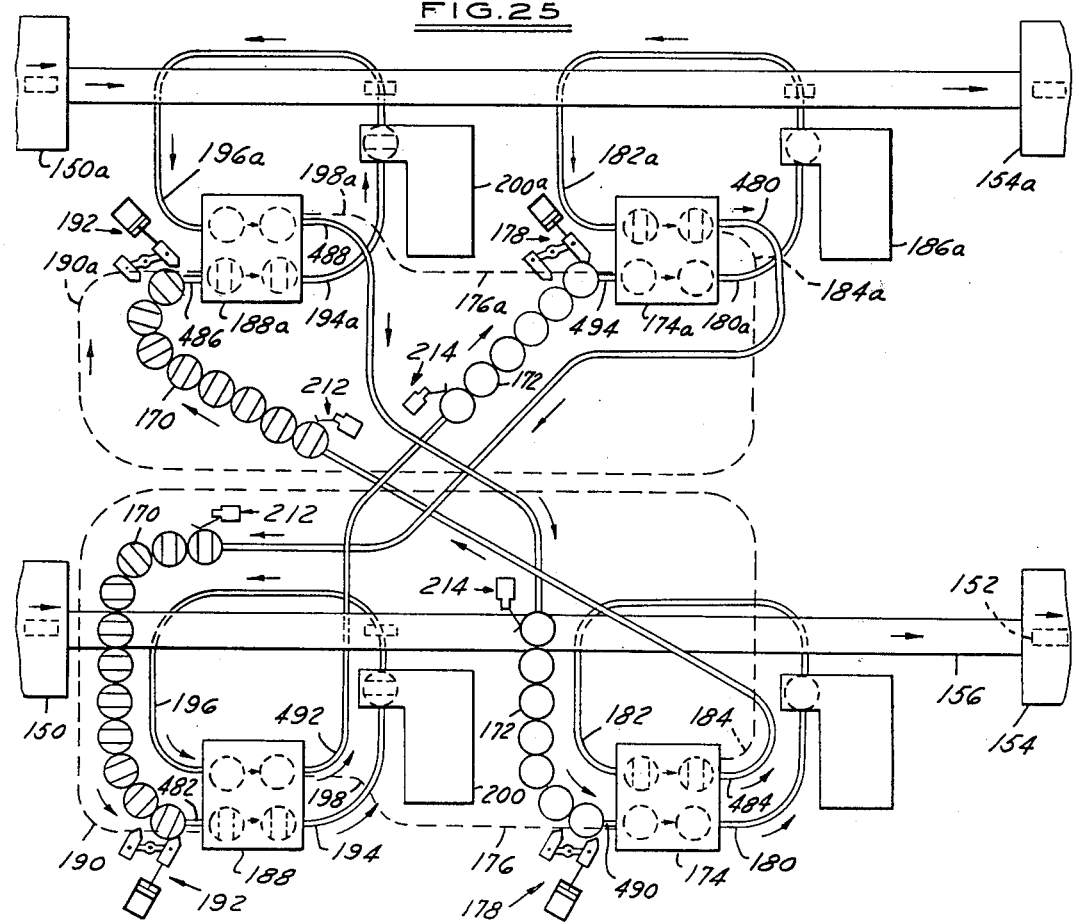

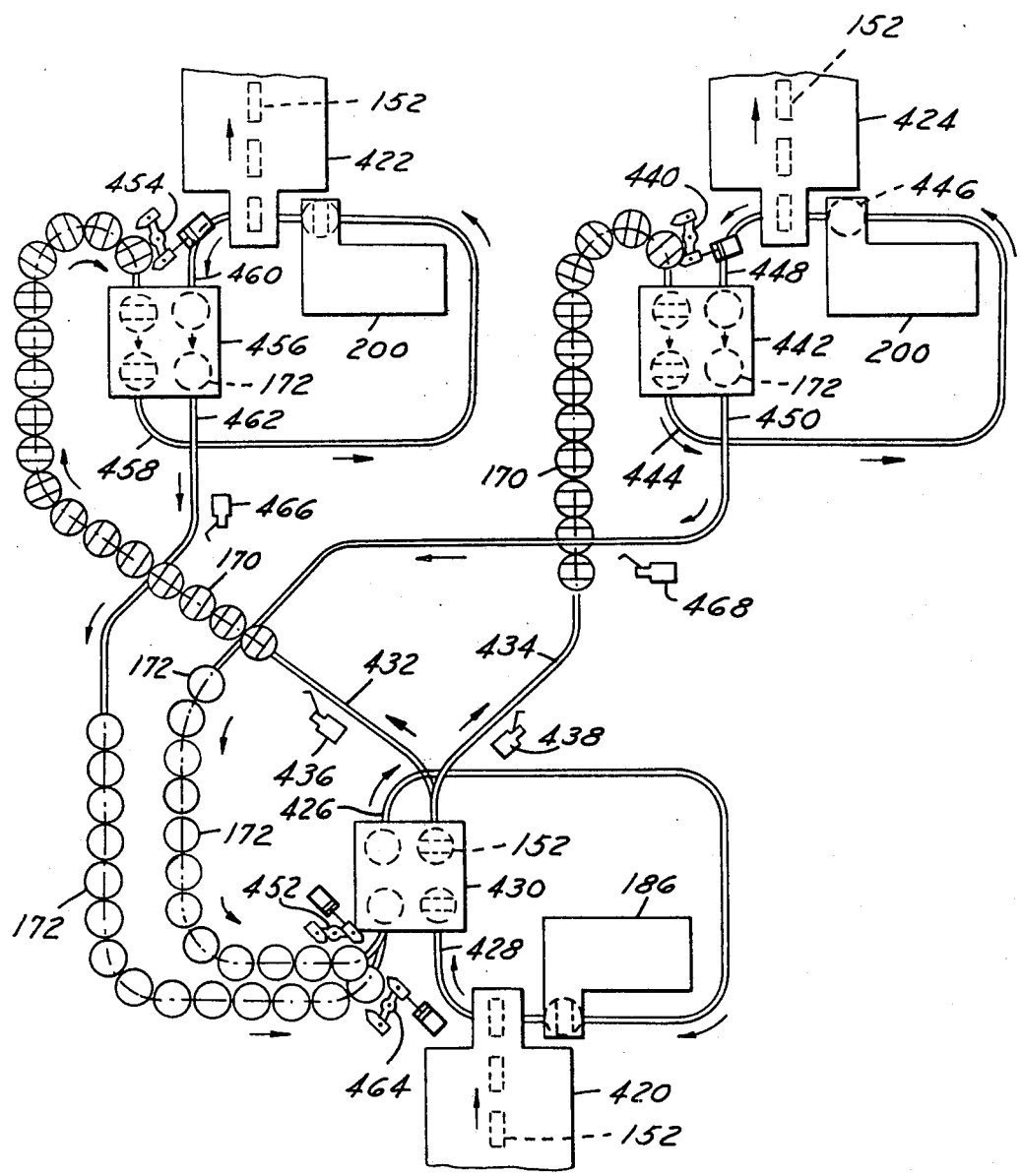

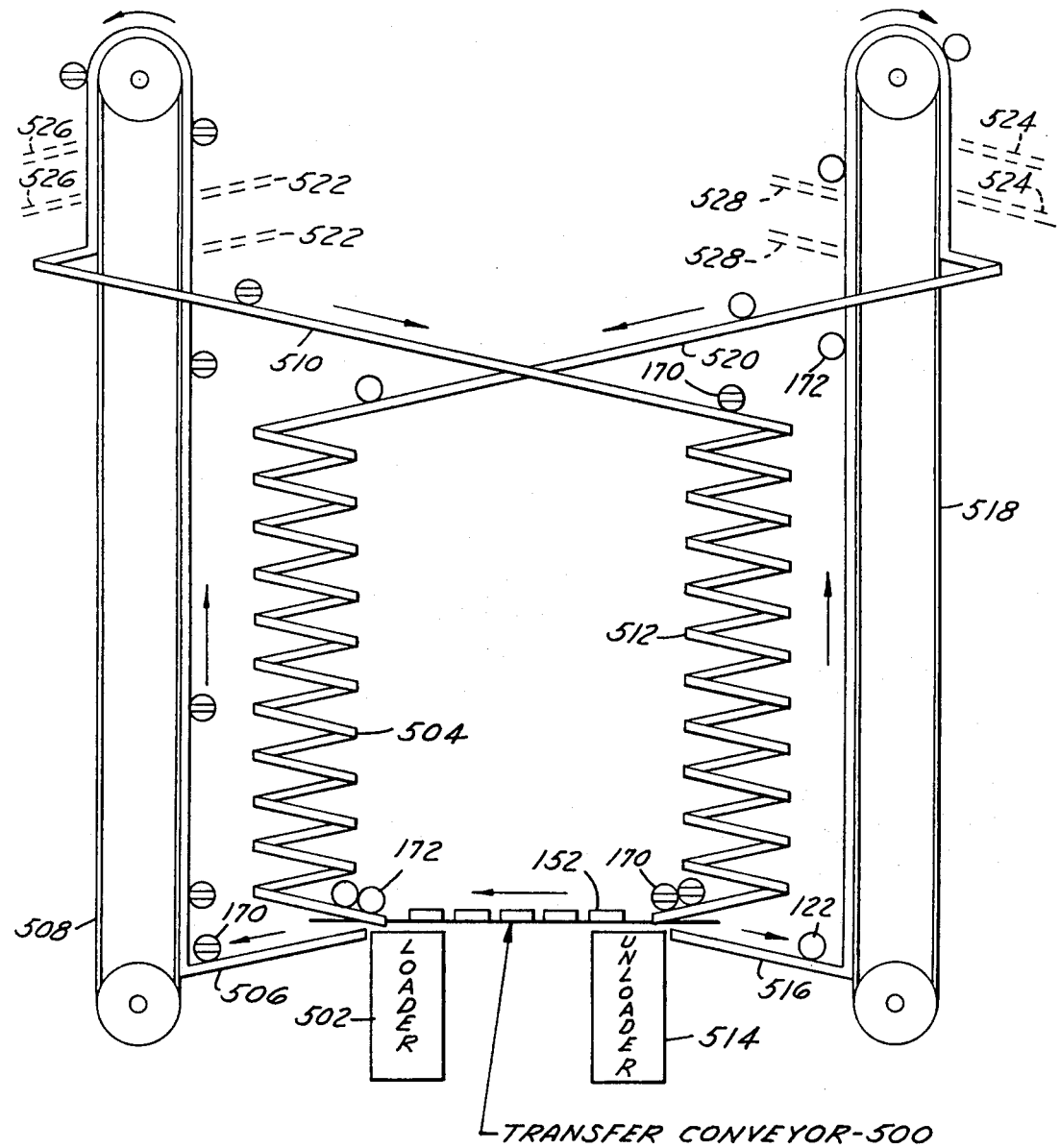

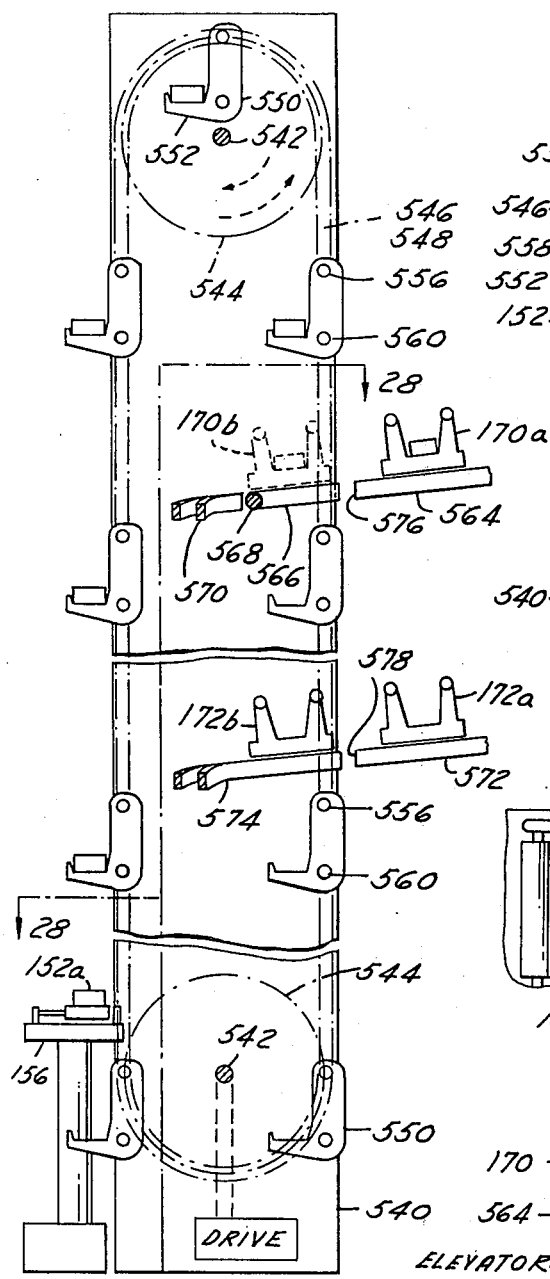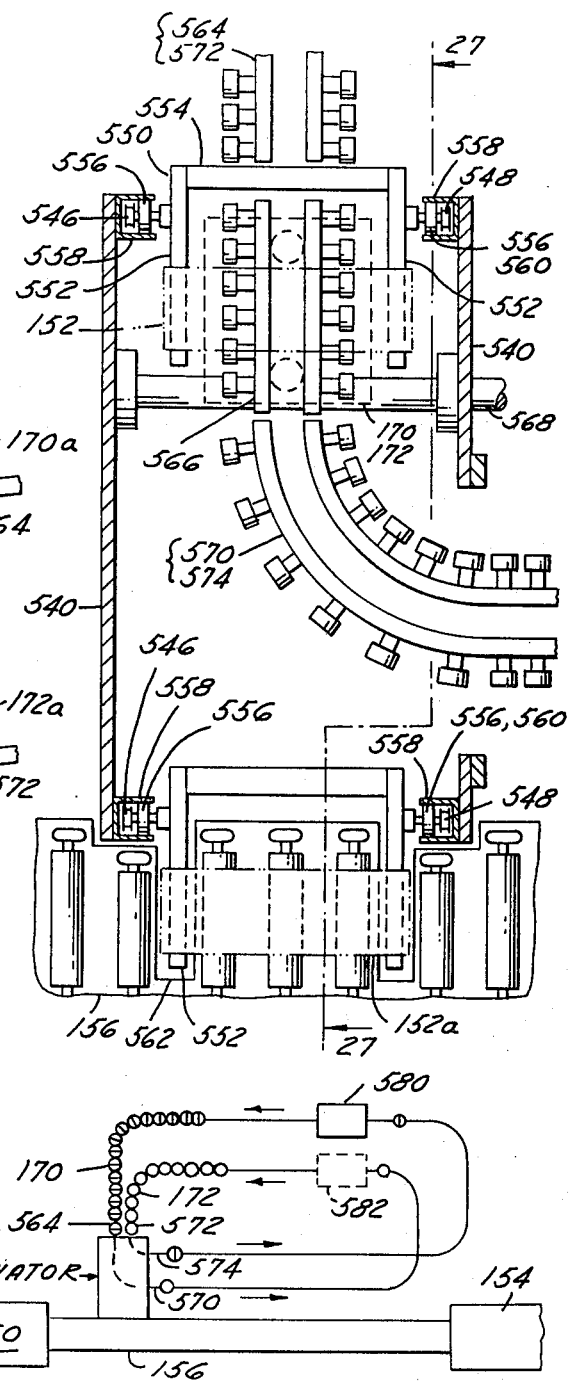

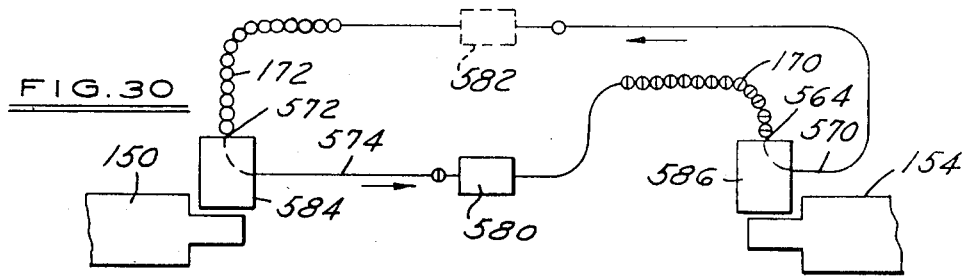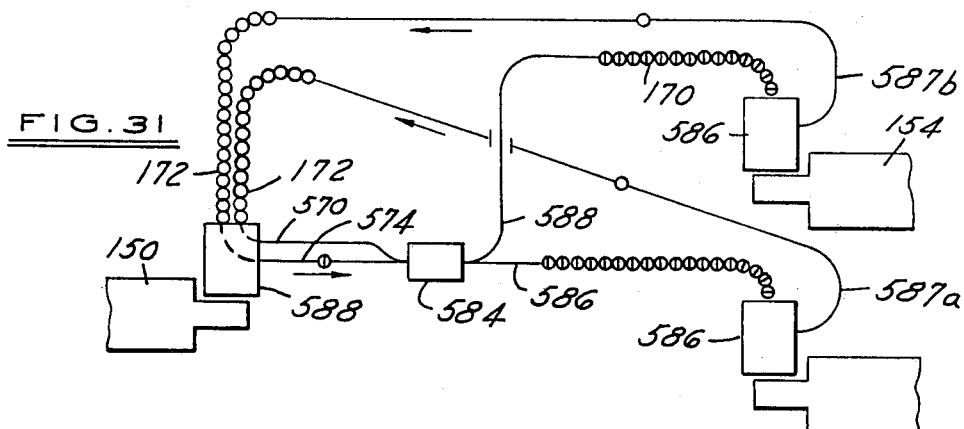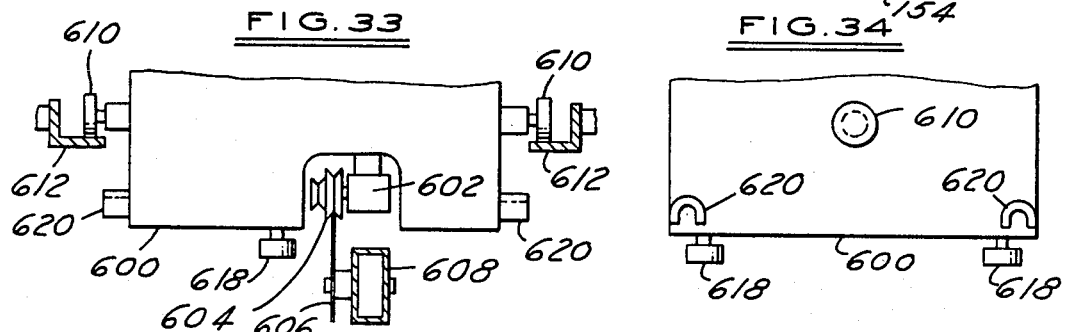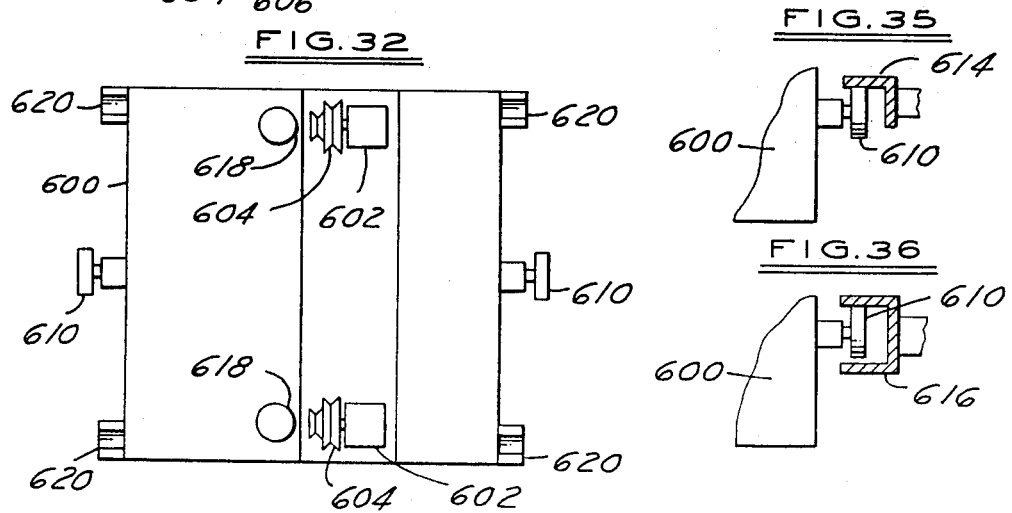

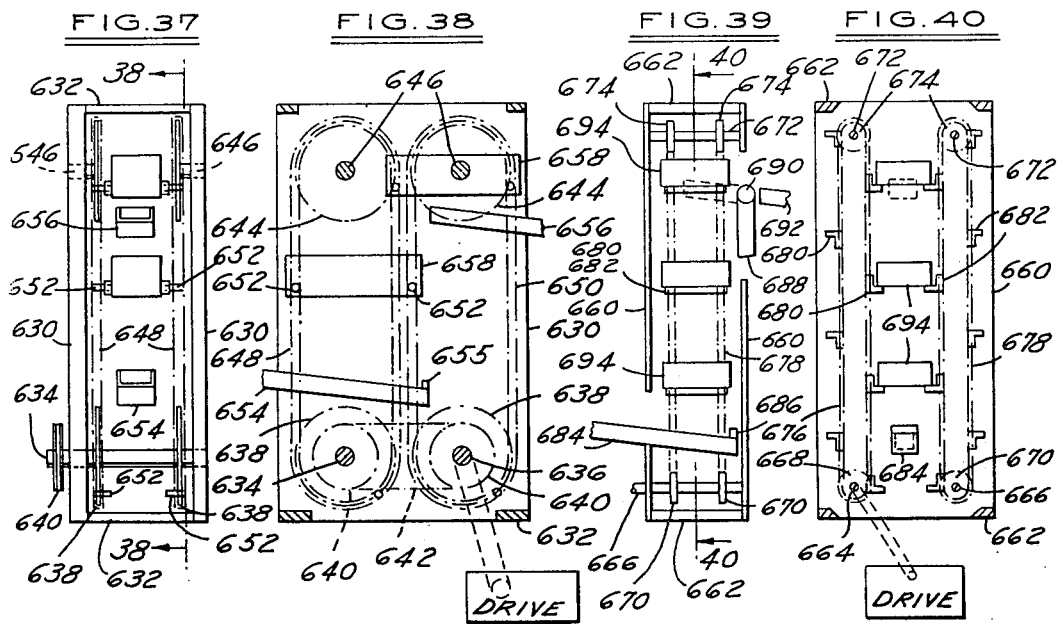
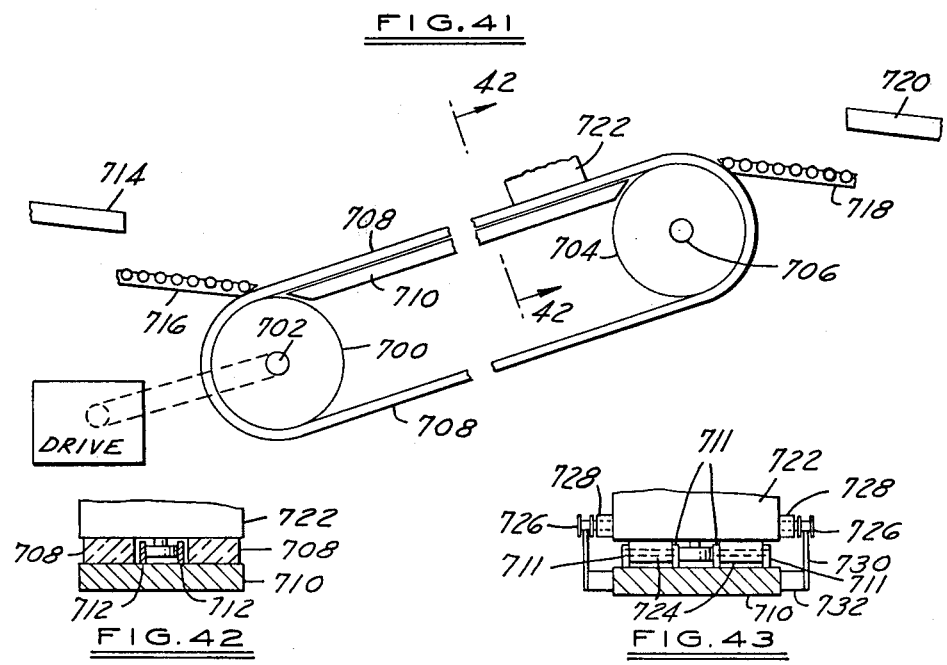

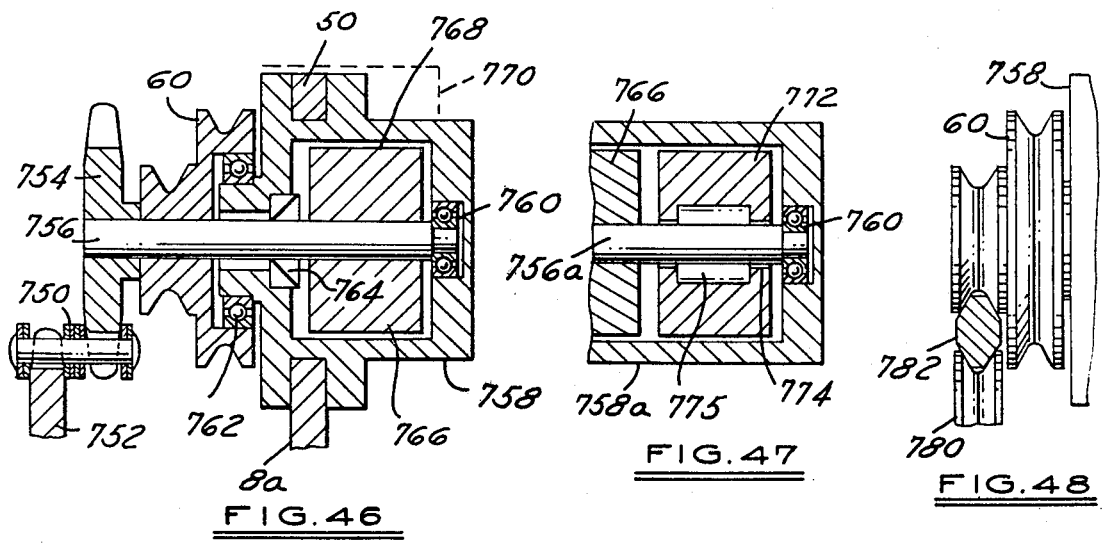
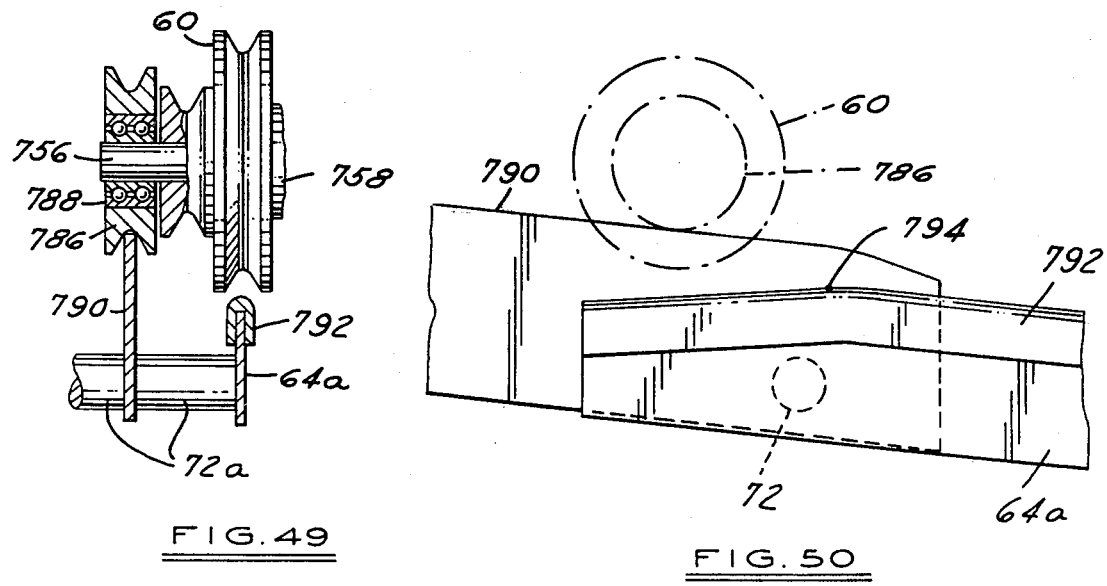

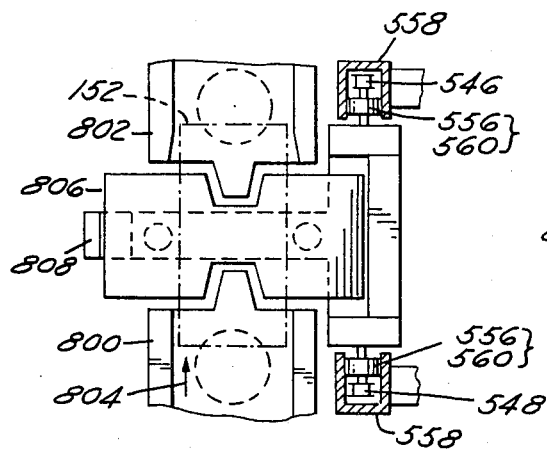
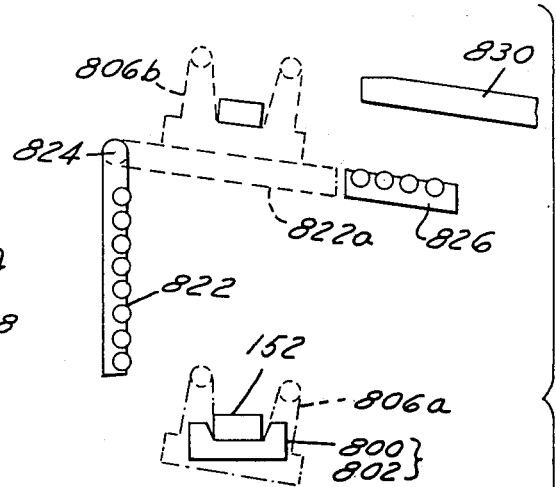
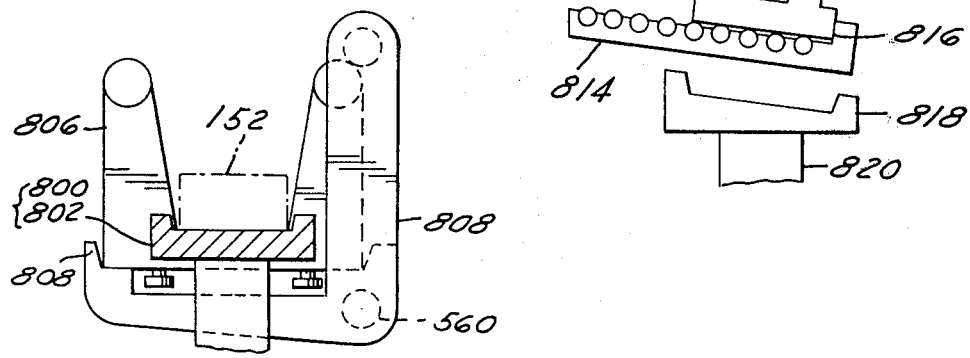

WORKPIECE STORAGE SYSTEM

This is a continuation of application Ser. No. 908,941, filed May 24, 1978, entitled "Workpiece Storage System", now abandoned.

This invention relates to a Workpiece Storage System between sections of a multiple section workpiece processing line and the further utilization of this workpiece storage system as a means of transferring workpieces between parallel transfer lines and the division and combining of workpieces on transfer lines requiring this function.

BACKGROUND

In the field of automatic machining, assembly, and other forms of workpiece processing, it is customary practice to use transfer machines which employ a multiplicity of stations which operate sequentially on a given workpiece, with a line of workpieces progressively transferred along the line of stations, by an automatic transfer mechanism.

For illustrative purposes, and by way of example, there exist in industry transfer lines for machining the cylinder heads for internal combustion engines, referred to as head lines. The total number of individual stations in such a head line may exceed 100. It will be understood that each station performs a given operation on each head (workpiece), and, at the end of a given cycle, the heads are indexed forward one station increment; and when a head is discharged from the line, all operations will have been performed on it.

Building such a line as a single transfer machine creates two significant problems: the first is the practical problem of building a transfer system capable of accurately and reliably transferring such a large number of heavy workpieces along a single transfer machine. The second concerns the likelihood of downtime. If a single station of a transfer machine is down or inoperative for a variety of reasons, among which are broken or dull tools, electrical, hydraulic, or mechanical malfunction, then the entire line, of which such a down station is a part, is down or nonoperative as a result. This situation has long been recognized in the industry, and, as a result, overall processing lines incorporating a large number of stations are generally subdivided into multiple sections which may range from 2 to 12 or more. Each such section is then operated as a single machine with its own independent transfer mechanism for transferring parts between its multiplicity of stations. Between such machine sections, there is generally incorporated an independent workpiece transfer system, which may be a roll conveyor, accumulating conveyor, power and free conveyor, monorail conveyor, and even manual labor, for transfer of the workpieces from the last station of the upstream section to the first station of the downstream section. In almost all cases, some degree of automatic or manual workpiece storage between sections is thereby achieved.

With some degree of workpiece storage between machine sections, it will be seen that when one station of a single section goes down, that entire section goes down, but the other sections may continue to operate for as long as there are workpieces stored in the between-section transfer system immediately downstream of the non-operative section and as long as there are spaces available in the between-section transfer system immediately upstream of the non-operative section.

As a broad generalization, the greater the amount of between-section transfer system storage capacity, the longer a given section may be down without causing the other sections to go down, and, as a second broad generalization, the larger the number of sections into which a given line is subdivided, the less likelihood a given section will be inoperative at any given time.

It is one objective of this invention to create a system of workpiece storage between sections which is more flexible, more economical, in terms of cost per part stored, and less wasteful of floor space than the systems presently in use.

In high production situations, it is not uncommon to find multiple parallel lines operating adjacent to one another in a given plant. Hypothesizing that there exist three parallel lines, A, B, and C, each of which is divided into six sections, 1, 2, 3, 4, 5, and 6, there arise many occasions in which, for example, section 1 of line A is down while at that same time, section 5 of line B is down, and at that same time, section 3 of line C is down. Under such conditions, it can be seen that with suitable cross-transferring between lines, the productivity of all three lines can be maintained at $\frac{2}{3}$ of the theoretical full productivity of all three lines, even though each line, as a continuous system, is down. This technique of cross-feeding between corresponding "between-section" transfer systems of multiple parallel lines to maintain partial production when non-corresponding sections of multiple lines are simultaneously down has also long been known and utilized by industry.

It is a further object of this invention to create a storage system which, by its nature, provides a simple means to transfer workpieces between corresponding points of multiple parallel processing lines.

In the processing of many types of workpieces, there often exist sections of transfer lines which are significantly slower in operation than the remaining sections of that same transfer line. In such cases, it is common practice to utilize two parallel identical sections, each of which operates on approximately half of the workpieces as compared to the remaining sections of the line.

It is a further objective of this invention to provide a means of dividing the flow from a single section of a transfer line to a multiplicity of parallel substantially identical sections of a transfer line in addition to the storage function of this invention; and, conversely, to provide a means of recombining the outputs from a multiplicity of substantially identical sections of a transfer line into a single input to a subsequent section.

Other objectives and features of the invention will be apparent in the following description, claims, and accompanying drawings in which the principles of operation and use are set forth in connection with the best modes presently contemplated for the practice of the invention.

Drawings accompany the disclosure and the various views thereof may be briefly described as:

FIG. 1, a segmental view of a pallet system showing pallet and track.

FIG. 2, an end view of the segment of FIG. 1.

FIG. 3, a view of a support roller with an alternate track relationship.

FIG. 4, a velocity force vector diagram.

FIG. 5, a view of an alternate wheel track arrangement.

Figure 6:
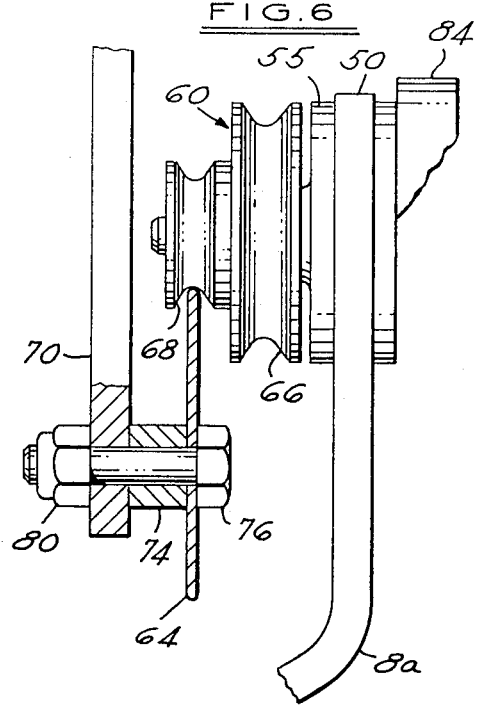

FIG. 6, a view of the wheel arrangement similar to FIG. 5 on an alternate wheel diameter.

Figure 7:
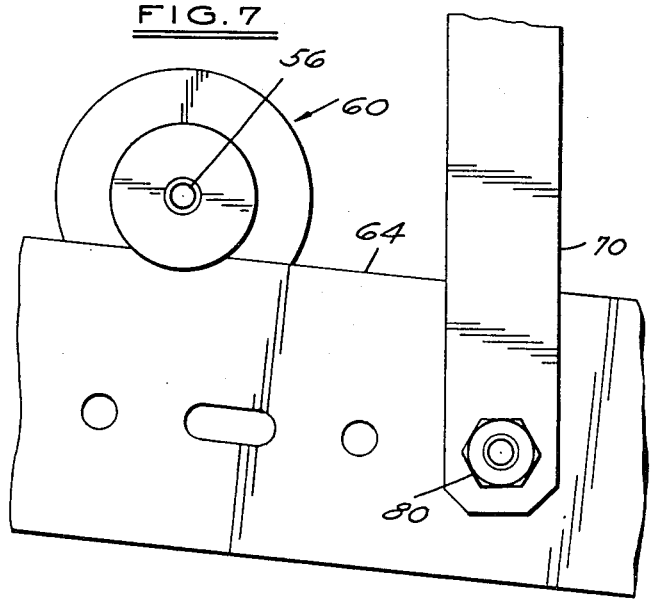

FIG. 7, a side view of the arrangement of FIG. 5.

Figure 8:
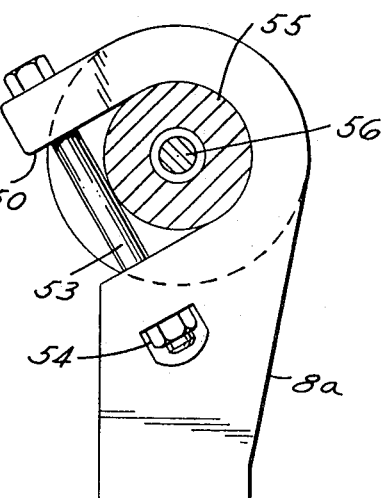

FIG. 8, a view of a hanger mounting construction.

Figure 9:
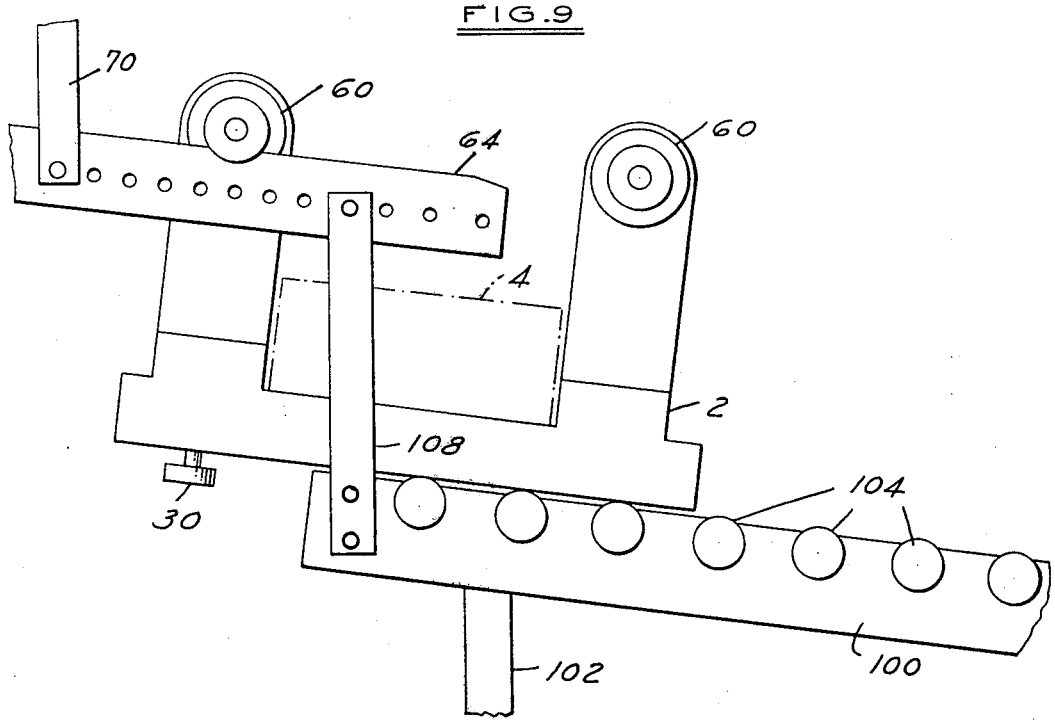

FIG. 9, a side view of an alternate roller transfer means.

Figure 10:
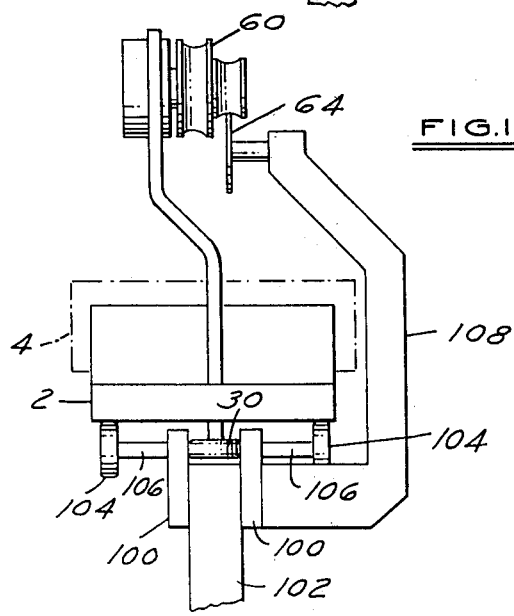

FIG. 10, an end view of the assembly in FIG. 9.

FIG. 11, a diagrammatic plan view of a storage system between two transfer line sections.

FIG. 12, an elevation view of an elevator section.

FIGS. 13 and 14, sectional views of the elevator taken on lines 13—13 and 14—14 of FIG. 12.

Figure 15:
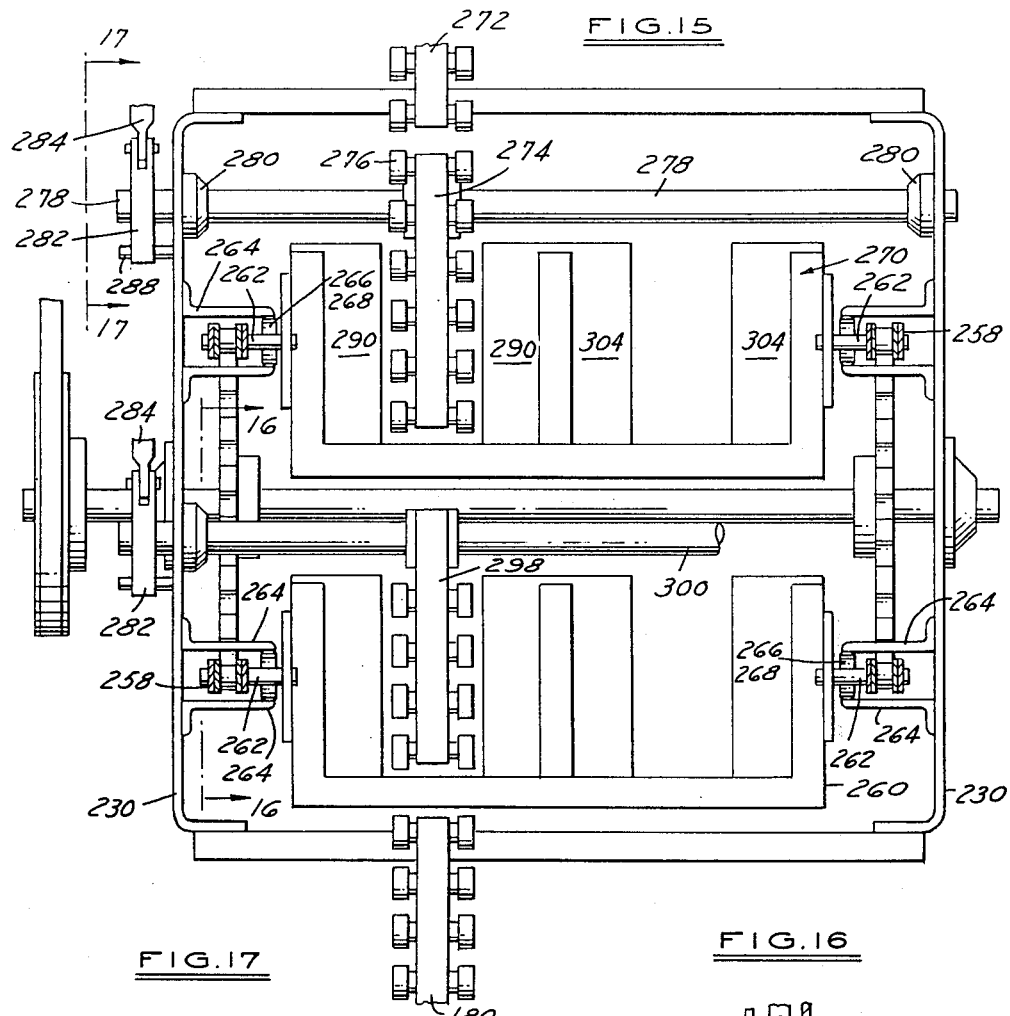

FIG. 15, a top plan view of the elevator section.

Figure 16:
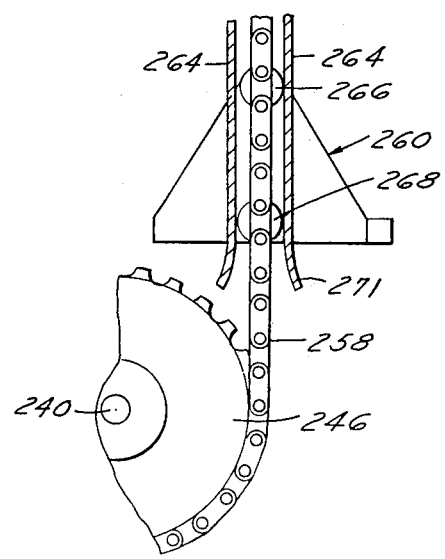

FIG. 16, a side view of the elevator chain guides.

Figure 17:
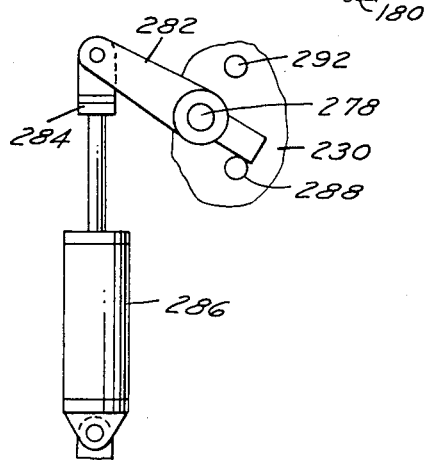

FIG. 17, a view on line 17—17 of FIG. 15.

Figure 18:
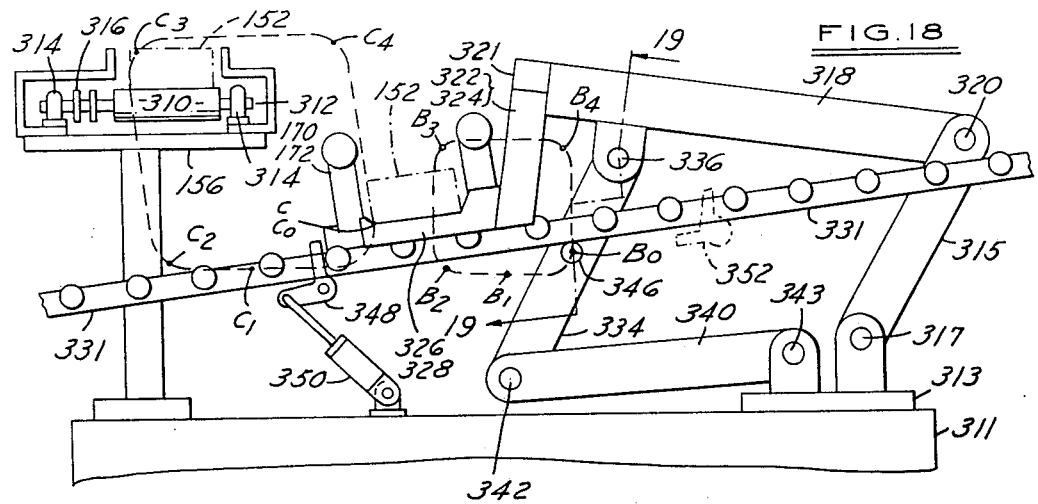

FIG. 18, a side view of a pallet loader and unloader.

Figure 19:
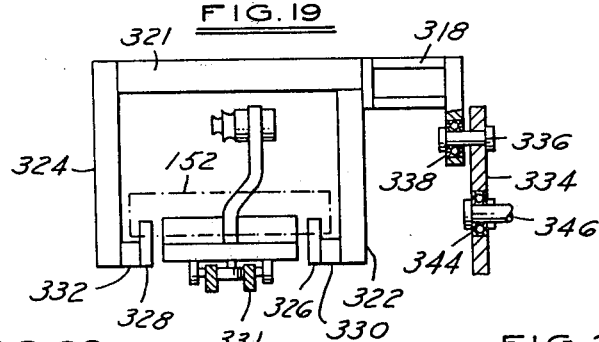

FIG. 19, a sectional view of line 19—19 of FIG. 18.

Figure 20:
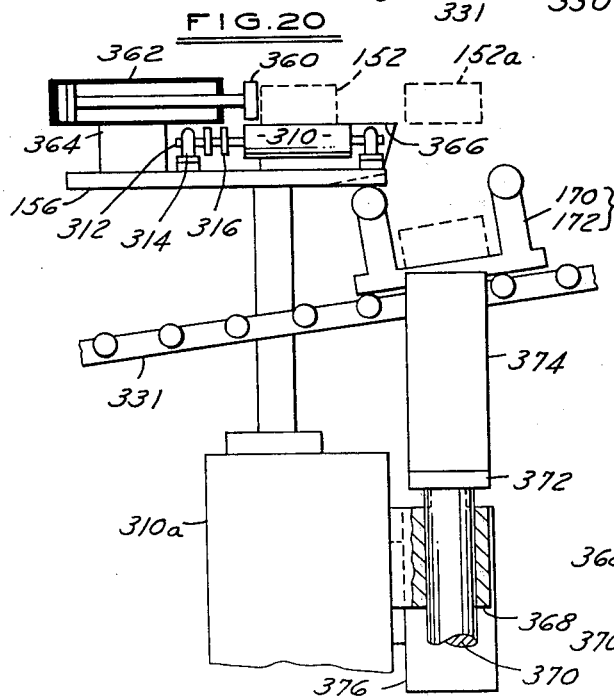

FIG. 20, a side view of a second embodiment of loading and unloading mechanism.

Figure 21:
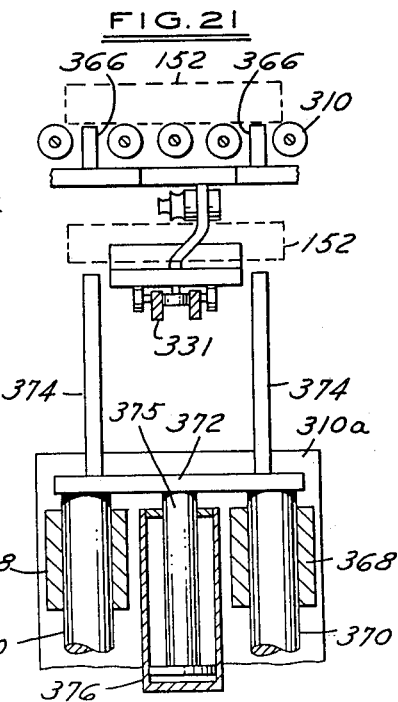

FIG. 21, an end view of the loader of FIG. 20.

FIG. 22, a plan view of a switching section of a conveyor track.

FIG. 23, a side view of the switching section of FIG. 22.

FIG. 24, a plan view of a modified track circuit.

FIG. 25, a plan view of another modification of a track circuit with parallel lines and storage on each line.

FIG. 26, a view of a helical down track to replace the lowerator sections.

FIG. 27, a side view of an elevator for direct lift or lowering of workpieces taken on line 27—27 of FIG. 28.

FIG. 28, a partial horizontal section of a part lifter and load and unload tracks.

FIG. 29, diagrammatic view of a part and pallet storage, load, and unload system using a single parts elevator.

FIG. 30, a diagrammatic view of a track layout utilizing two elevators for transfer of bare parts from one machine section to another.

FIG. 31, a view similar to FIG. 30 with delivery to two machine sections.

FIG. 32, a bottom view of a modified part carrier.

FIG. 33, an end view of the part carrier shown in FIG. 32.

FIG. 34, a side view of the parts carrier of FIG. 32.

FIG. 35, a sectional view of a modified roller and guide arrangement.

FIG. 36, a sectional view of another modified construction for a pallet guide.

FIG. 37, a front elevation of a modified pallet elevator.

FIG. 38, a side elevation on line 38—38 of the modified elevator of FIG. 37.

FIG. 39, a front elevation of another modification of a pallet elevator.

FIG. 40, a side elevation on line 40—40 of the modified elevator illustrated in FIG. 39.

FIG. 41, a side view of a pallet escalator.

FIG. 42, a sectional view on line 42—42 of FIG. 41.

FIG. 43, a modified escalator design shown in cross-section.

Figure 44:
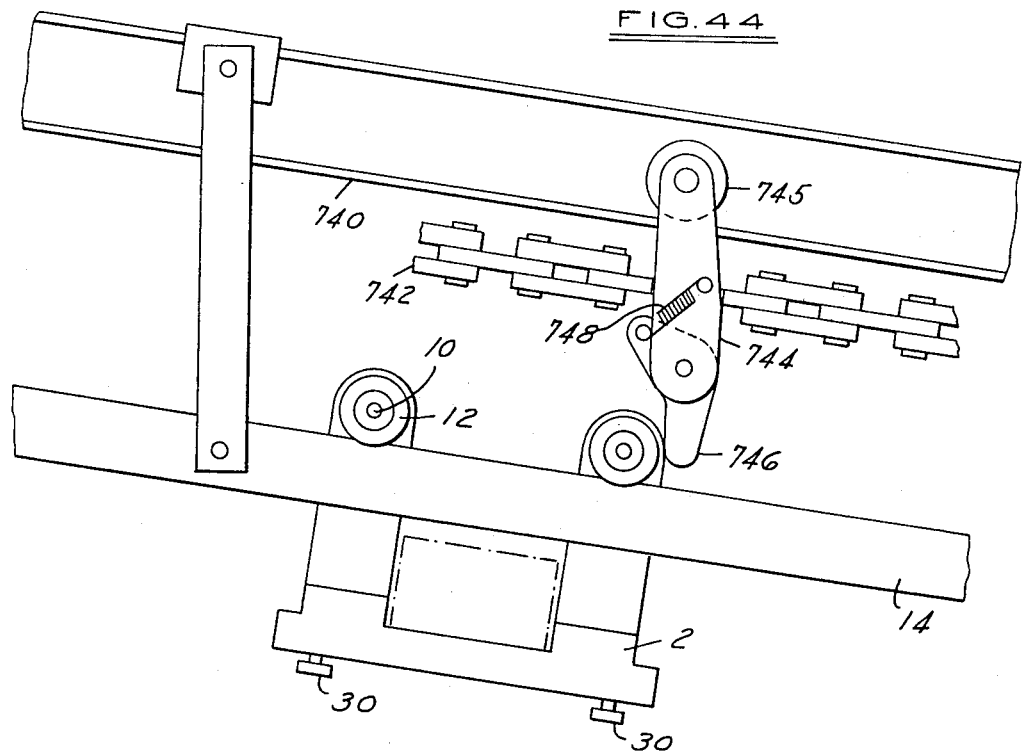

FIG. 44, a side view of a still further modification of a monorail, hanger type pallet escalator.

Figure 45:
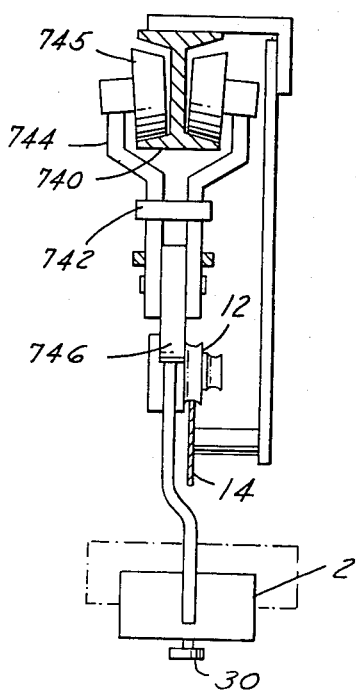

FIG. 45, an end view of the monorail escalator.

FIG. 46, a sectional view of a chain actuated upslope conveyor.

FIG. 47, a modified structure to provide differential resistance dependent on direction of movement.

FIG. 48, a belt actuated pallet mover.

FIG. 49, a secondary track lift to nullify a retarding device.

FIG. 50, a side view of the track lift of FIG. 49.

FIG. 51, a plan view of a pallet elevator design.

FIG. 52, a side view of the structure of FIG. 51.

FIG. 53, a work pallet level changer utilizing a vertically reciprocating actuator.

One basic element of this system is a pallet or workpiece holding carrier which is a means for supporting a workpiece during storage, cross-transferring, dividing, or recombining. A given pallet is unpowered but moves along a downwardly sloped track system on wheels, at least one of which is retarded by a braking system governed to maintain a controlled speed.

A first embodiment of a pallet and a short section of supporting track is shown in FIGS. 1 and 2. A pallet frame 2 supports a workpiece 4 in a nest configuration; the workpiece 4 is transversely located by a locator 6, as part of the nest. The pallet frame 2 in turn is supported by two hangers 8 whose lower ends support the pallet frame 2, and whose upper ends are formed into an inverted U structure, in which are journalled axles 10. On each axle 10 is mounted a wheel assembly 12 designed to operate on two different rolling diameters, with each rolling diameter terminated by a pair of guiding flanges. In FIG. 2, a wheel 12 is shown rolling on a track 14 consisting of a rectangular tube with its major axis vertical; in this condition, the wheel 12 is rolling on diameters 16 and guided with respect to the track 14 by flanges 18; the track 14 is in turn supported from a suitable structure by intermittently spaced hangers, one of which is shown as hanger 20. It will be noted that pallet 2 to track 14 configuration is such that workpiece 4 is made vertically captive in the pallet 2 by the underside of the track 14; i.e., the presence of track 14 prevents the workpiece 4 from being vertically removed from its nest in pallet 2.

The axle 10 of at least one of the wheels 12 is governed as to speed of rotation by an assembly made up of a body 22 attached to the pallet hanger 8, which in turn supports a seal 24 in which is journalled the shaft 10. A retarding disc 26 is fastened to the end of shaft 10 and a sealing cover 28 is bolted to case 22. A small but controlled space exists between one face of disc 26 and case 22, and between disc 26 and cover 28. This space is filled with a viscous fluid exhibiting substantially Newtonian characteristics, such as a silicone oil. It will be understood that in such a Newtonian fluid, the shear force required to shear the fluid is directly proportional to the time rate of shear exerted on the fluid. Therefore, the retarding torque exerted on the axle 10 by the disc 26 is directly proportional to the angular velocity of the axle 10. The factor of proportionality is dependent on the viscosity of the fluid, the diameter of the disc 26 and the thickness of the fluid space on the sides of the disc.

Whereas the retarders described in connection with FIGS. 2, 5 and 46 all employed a viscous fluid operating in shear between a rotor and a housing to create a retarding torque substantially proportional to the rotor angular velocity, the well-known principle of magnet and eddy current retardation can also be utilized. As related to FIG. 2, a permanent magnet or group of them would be mounted in the cover 28 or housing 18 or both to create a magnetic field perpendicular to the plane of the disc 26 which would be made of a suitable conductor such as aluminum. Rotation of the disc 26 would induce electrical currents therein proportional to the angular velocity, which in turn would create a proportional retarding torque. A comparable design, analagous to FIG. 46, would employ a cylindrical sleeve as a rotor as opposed to a disc. In either case, because of the lower torques attainable with eddy current retardation as compared with viscous retardation, a step-up gear ratio from the wheel shaft to the retarder shaft would be advisable.

In FIG. 3 is shown the wheel track arrangement for supporting and guiding a pallet when a pallet is moving along a track empty, i.e., without carrying a workpiece. In this case, the rectangular tubular track 14a is arranged with its major axis horizontal, and the wheel 12 rolls on the track 14a on the larger diameters 23 and is guided by flanges 25. The use of different diameters of rolling on the wheels permits the independent control of speed between full and empty pallets, including, but not restricted to, having full and empty pallets descend the downward sloping tracks at substantially identical speeds. Other uses of this feature will be subsequently described.

The effect of the rolling diameter on the speed of descent may be understood by reference to FIG. 4, a schematic velocity and force vector diagram of a wheel supporting a weight $W_1$ having a diameter $D_1$, and rolling down a track inclined to the horizontal at an angle $\alpha$, and moving with an angular velocity $\omega$ and linear velocity V. It can be seen that the force, parallel to the track, causing the wheel to move forward is:

$$F_1 = W_1 \sin \alpha$$

This in turn creates a torque on the wheel $$T_F = F_1 \frac{D_1}{2} = \frac{D_1}{2} W_1 \sin \alpha$$

As the wheel rolls down the track at a constant angle and substantial equilibrium is reached, i.e., the wheel is neither accelerating nor declerating, the forward torque $T_F$ and the retarding torque $T_R$ are equal (and opposite). The retarding torque may be expressed as:

$$T_R = K_1 \omega$$
Since $\omega = \dfrac{V}{\dfrac{D_1}{2}}$ where V is the equilibrium velocity, $$T_R = \frac{2 K_1 V}{D_1}$$
Since $T_F = T_R$
$$\frac{D_1}{2} W_1 \sin \alpha = \frac{2 K_1 V}{D_1}$$
Solving for V
$$V = \frac{\sin \alpha}{4 K_1} W_1 D_1^2$$

This equation indicates that the equilibrium forward rolling velocity is proportional to the weight and the square of the rolling diameter. In the specific case where it is desired to have the rolling velocity of an empty pallet equal the rolling velocity of a full pallet, it can be seen that:

$$W_E D_E^2 = W_F D_F^2$$

where $W_E$ and $W_F$ are the empty and full weights respectively and $D_E$ and $D_F$ are the rolling diameters for the empty and full conditions respectively. This condition can be expressed also as:

$$D_E = D_F \sqrt{\frac{W_F}{W_E}}$$

The multi diameter wheel technique is also useful in other areas to be covered in the ensuing description.

Referring again to FIGS. 1 and 2, there are mounted on the bottom of the pallet, two wheels 30, free to rotate on shafts 32. These wheels 30, which operate in a horizontal plane about vertical axes, perform a variety of functions to be subsequently described.

Ordinarily, the weight of the pallet, with or without the workpiece, is maintained and guided on the track by the wheel flanges 18 or 25. As a safety against jumping the track, a bar 34 is mounted on each pallet hanger 8. This bar would contact the underside of the track 14 before the wheel flange could ride over the top of the track, due to unforeseen circumstances; the pallet assembly is therefore totally captive on the track.

Since there are many conditions in which successive pallets abut one another while moving, or when a moving pallet runs into a stationary one, suitable bumpers 36 are mounted on each end of a pallet to absorb the contact forces encountered.

An alternate wheel track arrangement is shown in FIGS. 5, 6, 7 and 8. In this embodiment, the upper end of each pallet hangers 8a is formed into an open hook 50 which engages a circular groove 52 in a package or cartridge type wheel, axle, retarder assembly. The hook is closed and made captive on the cartridge by a bolt 53 and nut 54.

Referring to FIG. 5, the cartridge consists of a body 55 in which is journalled a shaft 56 through a bearing 58. A wheel 60 is mounted on one outboard end of shaft 56; this wheel 60 is further journalled to the outside of body 55 through bearing 62, which is the primary load carrying bearing. The outside of wheel 60 is formed into two double flanged grooves having two separate rolling diameters. In FIG. 5, the wheel 60 is shown engaging the track 64 with its larger rolling diameter 66; in FIG. 6, the wheel 60 is shown engaging the track 64 with its smaller rolling diameter 68.

The track 64 is comprised of a thin bendable ribbon of suitable material punched with holes or slots for mounting. This track is mounted from a suitable support by multiple hangers 70 through spacers 72 or 74 and bolts 76 or 78 and nuts 80. A material particularly desirable for use as a track is a high carbon, hardened steel given a chemical or heat treatment for corrosion resistance and known in the industry as "blue steel".

The retarder assembly is comparable to that shown in FIG. 2. Referring to FIG. 5, a disc 82 is fastened to and rotates with the other end of the wheel shaft 56. The retarder housing 84 is mounted coaxially to the cartridge body or made integral with it and contains a seal 86 to the shaft 56. The retarder cover 88 is fastened to the housing 84 to form a sealed cavity for the retarding fluid which fills the interspace between the two faces of the disc 82, housing 84 and cover 88, thereby creating a retarding torque on the shaft 56 which is substantially proportional to the angular velocity thereof.

FIGS. 7 and 8 show side views of the assemblies illustrated in FIGS. 5 and 6.

The primary means of supporting and guiding the pallets as they move through the system are the wheels 12 or 60 mounted thereon usually, but not always, with a retarder as shown in FIGS. 2 and 5. For reasons to be described, it is convenient and necessary to have the pallets move through the system part of the time by other means.

One such other means is shown in FIGS. 9 and 10. Two structural rails 100 are suitably supported by columns 102 at appropriate intervals. On these rails are mounted a series of two rows of free running rollers 104 through spacers such as 106. The upper surfaces of these rollers 104 form a nominal plane slightly above the upper surfaces of the rails 100. The inner faces of the rails 100 constitute a channel which forms a guide for the pallet mounted rollers 30 (FIGS. 1 and 2). A pallet 2 will, therefore, freely roll on and be guided by such an alternate track system.

In FIGS. 9 and 10, a pallet is shown in transition from a track system employing the stationary track 64 and pallet support wheels 60, to the support and guidance system employing stationary rollers 104 and guide rollers 30 which will be further referred to as a roller bed track. To maintain alignment between the stationary track 64 and the roller bed track, an alignment frame 108 is connected between them.

While FIG. 9 shows a pallet 2 in transition from stationary track 64 to roller bed track 100, it is clear that the inverse transition from roller bed track to stationary track 64 can be made with equal ease. The roller bed track can be curved by suitable curving of the structural rails 100, in which case the upper surfaces of the rollers generate a helical rather than a plane surface.

An illustrative system to accomplish workpiece storage between two sections of a transfer line is shown schematically in FIG. 11. Under normal operation, i.e., when the last section 150 of the upstream transfer line is delivering workpieces 152 and the first section 154 of the downstream transfer line is accepting workpieces 152, the flow of workpieces 152 from one section to the other is along a powered roll conveyor 156, or its equivalent, such as a walking beam conveyor, power and free conveyor or the like. As the workpieces 152 arrive at the entrance of the machine section 154, they are metered by an escapement mechanism consisting of cylinders 158 and 160 which operate gates 162 and 164 respectively. At appropriate times in the automatic cycle of machine section 154, an automatic loader, comprised of cylinder 166, and pusher 168, slides a workpiece 152 into the first station of machine section 154, from which point it is transferred through the machine section 154 by its internal transfer system. This portion of FIG. 11 is a typical and normal technique presently in use in industry.

As a convention in the representation of the storage system, all pallets which are carrying workpieces are represented by circles crossed by a double line as at 170 and referred to as full, and all pallets which are not carrying workpieces are represented by open circles 172 and referred to as empty. The storage system utilizes pallets 170 or 172, which previously have been described (pallet 2 in FIGS. 1 and 9). Dual function elevator-lowerators 174 and 188 in the storage system cooperate with a topological closed loop track system, the function of which will now be described. The elevator-lowerator 174 accepts empty pallets 172 at an upper level track 176 from an escapement 178 and delivers them to a lower level track 180, and simultaneously accepts loaded pallets 170 from a lower level track 182 and delivers them to an upper level track 184; a pallet loader mechanism 186 transfers a workpiece 152 from the conveyor 156 to a pallet on the lower level track 180-182 transforming a pallet from empty 172 to full 170; a second dual function elevator-lowerator 188 accepts full pallets 170 at an upper level track 190 from an escapement 192 and delivers them to a lower level track 194, and simultaneously accepts empty pallets 172 from a lower level track 196 and delivers them to an upper level track 198; a pallet unloader mechanism 200 transfers a workpiece 152 from a pallet on the lower level track 194-196 to the conveyor 156, thereby transforming a pallet from full 170 to empty 172; and a gating and sensing mechanism on the conveyor 156 with a limit switch 202 signals the pallet unloader mechanism 200 that an open space is available on the conveyor 156. A cylinder 204 operates a gate 206 to stop workpieces 152 on conveyor 156 during operation of pallet unloader 200, and a second gate 208 operated by cylinder 210 controls the flow of a workpiece 152 to a further downstream position on conveyor 156. Such a gating and sensing mechanism may also be employed with the pallet loader mechanism 186.

The lower level track in the topological closed loop system which operates from 180 to 182, and is associated with the pallet unloader 186, descends at a substantially uniform angle from its beginning at 180 to its ending at 182; the exit level of the empty pallet 172 from lowerator 174 is therefore appropriately higher than the entry level of the full pallet 170 into elevator 174. Similarly, the lower level track which operates from 194 to 196 has a difference in exit and entrance levels from and to the lowerator elevator 188 to generate the required descending flow.

While the lower level tracks 180-182 and 194-196 of the closed loop system are near the floor and at a specific height required by the characteristics of the pallet loader 186 and the pallet unloader 200, the two upper level tracks 184-190 and 198-176 are not as constrained. To conserve floor space, these upper level tracks 184-190 and 198-176 will be at a height above the normal passage level required by personnel, lift trucks, etc. The routings shown in FIG. 11 are for illustrative purposes only. The routings may extend over either or both of the machine sections 150 or 154, or wherever is most convenient or economical. The structural support may be from the machine sections, from floor mounted columns, from the overhead plant structure, or some combination thereof.

Full pallets 170 exit from the elevator 174 to enter the full pallet storage track, which runs from 184 to 190 with a substantially uniform descending slope, and form a queue thereon, to be released as required by escapement 192. As the lead full pallet 170 is released into the lowerator 188, the remaining full pallet queue advances one pallet length due to the slope of the track 184-190. A high level switch 212 senses when this track is fully loaded with full pallets.

Similarly, empty pallets 172 exit from the elevator 188 to enter the empty pallet storage track, which runs from 198 to 176 in a substantially uniform descending slope, and form a queue thereon to be released as required by escapement 178. As the lead empty pallet 172 is released into the lowerator 174, the remaining empty pallet queue advances one pallet length due to the slope of the track 198-176. A high level switch 214 senses when this track is full of empty pallets.

Functional schematic drawings of a combination elevator-lowerator as exemplified by 174 in FIG. 11 are shown in FIGS. 12–17. Referring to these figures, two vertical channel frames 230 are spaced by lower headers 232 and upper headers 234. An upper sprocket shaft 236 is journalled in pillow blocks 238 mounted in the frames 230 and a lower sprocket shaft 240 is similarly journalled in pillow blocks 242 mounted in the frames 230. Two chain sprockets 244 are mounted on the upper shaft 236 and two chain sprockets 246 (FIG. 13) are mounted on the lower shaft 240; the lower shaft 240 is driven by a motor 248, gear reducer 250, sprocket 252, chain 254, and sprocket 256 on shaft 240. Alternately, the shaft 240 may be driven from the gear reducer 250 by an intermittent drive mechanism of the type shown in my U.S. Pat. No. 3,789,676 or my U.S. Pat. No. 3,859,862.

A pair of chain loops 258 operate between the upper sprockets 244 and the lower sprockets 246. A pallet carrier or bucket 260 is intermittently suspended from each chain loops 258 by an extended pin 262 (FIG. 15). These pins are stabilized in guides 264 by auxiliary rollers 266 on the straight vertical chain runs. Each bucket 260 is additionally stabilized against swaying about its pin connection to the chain 258 by a roller 268 mounted on the lower end of each side of a bucket 260 and guided by the guides 264. The guides 264 have a bellmouth configuration 271 at each end of their vertical straight run to facilitate entry of the rollers 266 and 268.

Each bucket 260 is arranged to accept both a full pallet 170 and an empty pallet 172, both simultaneously and separately; one side of each bucket 260 is allocated to carry full pallets 170, and the other side is designated to carry empty pallets 172.

The entry of pallets, empty or full, into an elevator or lowerator is controlled by gates which may be fixed or movable; similarly, the exit of pallets, empty or full, from an elevator is also controlled by gates which may be fixed or movable.

A pallet, empty or full, is primarily movable through the system on sloping fixed tracks and pallet mounted wheels as described in connection with FIGS. 1, 2 and 3. A pallet, empty or full, can also move on a roller bed track as described in connection with FIGS. 9 and 10. It is on this roller bed track that pallets, empty or full, enterr and exit the elevator-lowerator such as 174.

Referring to FIGS. 14 and 15, the buckets 260 are in the descending flight, and the buckets 270 are in the ascending flight. Relating to FIG. 11, the track 176 carrying empty pallets becomes a roller bed track 272 shortly before abutment to the elevator. Closely abutting the stationary roller bed track 272 is a movable section of such track. A channel section 274 carries a group of two sets of rollers 276; the open upward side of the channel is to control the center guide rollers 30 on the pallets. This channel section is supported by a shaft 278 mounted in pillow blocks 280 on the frame 230.

Referring to FIG. 17, the shaft 278 extends beyond the frame 230 and has mounted to it an actuator clevis arm 282, the outboard end of which is pivotally connected to an actuator 284 operated by a cylinder 286 attached to the frame 230. When the cylinder 286 is extended, as shown in FIG. 17, the actuator arm 282 is positioned against a stop 288, at which time the movable section 274 of the roller bed mounted on the shaft 278 is in effect a continuation of the fixed roller bed 272 at substantially its same slope, and the section 274 extends into an open slot of a bucket 270. A pallet released by the escapement, as at 178 in FIG. 11 will roll down the roller beds 272 and 274 and will be picked up by the bucket 270 on surfaces 290 as the bucket 270 move upward in its vertical path.

With the cylinder 286 in its retracted position, the actuator arm is rotated approximately 95° counterclockwise until it rests against stop 292. With the shaft 278 in this position, the movable section of the roller bed mounted on channel 274 is in the position 296 shown in FIG. 14. In this position, pallets cannot be loaded into the buckets 270, but buckets which have already been loaded can move upward through the gate space without interference. These conditions will be subsequently described.

Similarly, on the descending flight of buckets 260, empty pallets can be removed from the buckets by a movable gate 298 mounted on shaft 300, which is actuated by a mechanism substantially identical with the mechanism shown in FIG. 17. With the exit gate in the position 298 shown in FIG. 14, empty pallets are stripped from the vertically downward moving buckets and roll out onto the fixed exit roller track 180 as related to FIG. 11. With the exit gate in its retracted position 302, empty pallets in the buckets 260 move past the exiting level for another trip around the chain loop.

In some instances, in which there exists only a single entry point and a single exit point, the gates may be fixed rather than movable; this requires that every pallet will be stripped out as its carrying bucket moves past the fixed exit gate level. Therefore, all buckets reaching the entry gate level will always be empty of a pallet and the entry gate may be fixed without danger of interference.

The diagram of FIG. 14 represents that portion of a combined elevator-lowerator which handles the empty pallets and is termed a lowerator. When carrying an empty pallet, each bucket carries such a pallet on the surfaces 290 (FIG. 15).

Each bucket may simultaneously and separately carry a full pallet on surfaces 304 (FIG. 15). The section shown in FIG. 13 schematically represents this construction and function as related to tracks 182 and 184 of FIG. 11. Full pallets enter from track 182 through a gate substantially similar to the gate associated with the empty pallets. Full pallets are lifted up and over the sprockets 244, to be discharged at the upper track level 184, again by a gate mechanism substantially similar to the one associated with empty pallet discharge.

In essence, a single chain loop mechanism, as described above, is capable, through the use of dual function buckets, of simultaneously acting as an elevator for full pallets and a lowerator for empty pallets, as schematically depicted by 174 in FIG. 11.

In FIG. 11, it will also be noted that the combination elevator-lowerator 188 accepts full pallets at an upper level track 190 and discharges them at a lower level track 194, while accepting empty pallets at a lower level track 196 and discharging at an upper level track 198. This is the inverse of the function described in connection with FIGS. 12–17. But it is easily seen that the function of elevator-lowerator 188 is met by merely reallocating the bucket functions, such as by carrying full pallets on surfaces 290 and empty pallets on surfaces 304 of the buckets 270 shown in FIG. 15.

While it is generally more convenient and economical to have a single mechanism perform the dual function of elevator and lowerator, applications arise in which single units only are employed. In such cases, a bucket can carry only a single pallet, either full or empty.

In FIG. 11, the schematic plan of an illustrative storage system, are shown a pallet loader 186 and pallet unloader 200. Either of these operations can be performed by the mechanism shown in FIGS. 18 and 19. Referring to these figures, a workpiece 152 is moved along a roll conveyor 156 (FIGS. 11 and 18) comprised of closely spaced rollers 310 mounted on shafts 312, which are journalled in pillow blocks 314 and driven by chain sprockets 316 from a suitable and conventional motor and gear reducer. The workpieces are moved along this conveyor in their normal progress from machine section 150 to machine section 154 shown in FIG. 11.

The pallet loader mechanism consists of a base 311 (FIG. 18), on which is mounted a bracket 313 containing two pivot points about which the linkage mechanism operates. A box link 315 is pivotally connected to the bracket 313 by a shaft 317 at one end; and at its other end, the box link supports the beam link 318 with a pivot connection at shaft 320. The other end of beam link 318 mounts a nest assembly comprised of a horizontal beam 321, on which are mounted two arms 322 and 324 (FIG. 19), which in turn carry split nests 326 and 328 through spacers 330 and 332.

The beam link 318 is controlled and driven by a driver link 334 through a pivot connection at shaft 336 and bearing 338. The other end of the link 334 is pivot connected to a control link 340 through a shaft 342; and the other end of the link 340 is pivot connected to the bracket 313 by a shaft 343.

In the general area of the center of link 334, but at a specific point determined by geometric layout, the link 334 is connected by bearing 344 to the output shaft 346 of a mechanism, such as shown in my U.S. Pat. No. 3,857,479 capable of generating a substantially square path of its output shaft. Such a mechanism, mounted on the base 311, causes the shaft 346 and the corresponding point B on the link 334, shown at position B0, to move along the path B0, B1, B2, B3, B4. Through the action of the linkage, the point C, shown at position C0, on the split nests 326 and 328 moves along a path C0, C1, C2, C3, C4. The roll conveyor 156 is provided with slots between the rollers through which the split nests 326 and 328 can move during the traverse of this path.

Also mounted on the base 311 on one side of the linkage mechanism, and spaced between split nests 326 and 328 is mounted a section of roller bed track 331 which corresponds to a section of the lower level track 180 in FIG. 11. An empty pallet moves down this roller bed track to be stopped by a stop pawl 348, which is pivot mounted to the track 331 and actuated by a cylinder 350 mounted on the base 311.

When an excessive number of workpieces accumulate on the roller conveyor 156, as determined by limit switches thereon, the pallet loader mechanism operates through a cycle from a starting position in which point C on the split nests 326 and 328 is at the position $C_1$ and moves along the path C1, C2, C3, C4, C0, C1. As the split nests approach the position C3, they pass upwardly through the rollers 310, some of which are cantilevered at the sprocket end, and they lift a workpiece 152 vertically upward from the roller conveyor 156; continued movement of the nests to point C4 moves the workpiece substantially horizontally clear of the conveyor and subsequent movement to the point C0 lowers the workpiece into the waiting empty pallet 172, thereby transforming it into a full pallet 170, as shown in FIG. 18. The linkage and split nests 326 and 328 continue moving until point C reaches C1, at which time the pallet loader mechanism is completely clear of the now full pallet 170; the pallet loader linkage now stops to await the next cycle. The cylinder 350 retracts the stop pawl 348, and the full pallet now rolls down the track 330 to the pallet elevator. In some instances, the roller nest type track may have a transition to fixed rail type track for this run, either before or after the load position, or both; However, it can be seen that at the load point, a section of roller nest track must be used too since the fixed track would interfere with the loading path of the workpiece.

Shortly after the now full pallet 170 has moved away from the load position, the stop pawl 348 is returned to the stop position shown, to await the arrival of the next empty pallet. Referring to FIG. 11, the full pallet rolls down the track to the entry point 182 on elevator 174. With the pallet positioned slightly above the lifting bucket, the elevator 174 indexes one bucket pitch lifting the full pallet one pitch. Simultaneously, an empty pallet is lowered to the discharge point at track end 180.

For long cycle operations, about 15 seconds or more, the use of only one pallet at a time in the track section 180-182 is sufficient. To achieve higher cycling rates, two, three or more pallets will simultaneously be on this same track section 180-182; and with multiple pallets on this track section, additional control points are required, specifically an upstream stop or escapement for empty pallets, such as shown by step 352 (FIG. 18), and an escapement at the entry into the elevator for full pallets at track position 182.

The mechanism shown in FIGS. 18 and 19 has been described in connection with the loading of workpieces from the roller conveyor to a waiting empty pallet. This same mechanism is also usable to lift workpieces from a full pallet to the roll conveyor, as required of the pallet unloader 200 in FIG. 11.

To operate as a pallet unloader, full pallets roll down the roller nest track to be stopped by pawl 348. The unloader linkage is moved in the opposite direction; i.e., point B of the square generating mechanism traverses its path in the sequence B1, B0, B4, B3, B2, B1; and point C on the split nests 326, 328 traverses its path in the sequence C1, C0, C4, C3, C2, C1. At the point C0, the split nests 326-328 engage the workpiece 152 in the pallet, lift it upward and free of the pallet while moving to C4, and move it horizontally over the roll conveyor 156 in moving to C3. Shortly after moving past C3, the split nests deposit the workpiece onto the roll conveyor; they then continue empty to point C2 and finally to point C1 to await the next pallet unload cycle. The now empty pallet may be released at any time after the point C reaches C4 and the workpiece is clear of the pallet proper.

The mechanism of FIGS. 18 and 19 usable to either load or unload pallets is provided as one example. Other mechanisms employing cylinders may also be used; or the linkage mechanism may be replaced by slide mechanisms.

An alternate system for loading or unloading workpieces from the roll conveyor to the pallets is shown in FIGS. 20 and 21. A section of roller bed track 331 is still used to support and guide the pallet 170, 172 which is stopped for loading (or unloading) previously described.

a pusher bar 360 is mounted on the rod of an air or hydraulic cylinder 362 which in turn is mounted from the base plate of the power rail conveyor 156 through a riser 364. Two transverse slide rails 366 are mounted on the power roll conveyor 156, interspaced between rollers 310 and extending beyond the power roll conveyor in a direction towards the stopped pallet 170, 172.

The base 310a is modified relative to base 311 of FIG. 18. On the base 310a are mounted two guide blocks 368 in which are slidably supported two guide rods 370, which in turn support and guide a lifter base plate 372, on which are mounted two lifter rails 374. The lifter base plate 372 is connected to and driven by the rod 375 of an air or hydraulic cylinder 376 mounted on the base 310a.

When the rod 375 of cylinder 376 is retracted as shown in FIGS. 20 and 21, the tops of the lifter rails 374 lie below the lower plane of the workpiece 152 when it is nested in the pallet 172. When the rod 375 of cylinder 376 is extended, the lifter base plate 372 and lift rails 374 are moved vertically upward, as guided by rods 370, such that, at the end of the stroke, the upper surfaces of the lift rails 372 are substantially coplanar with the top surfaces of the slide rails 366. It will be noted that the lift rails 374 straddle the roller nest conveyor 331 during such a lift movement.

To accomplish the loading of a pallet 170 from the power roll conveyor 156, an empty pallet 172 is stopped in the position shown in FIG. 20, and the lift rails 374 are extended to their upper position. The pusher 360 is extended, sliding the workpiece transversely across the rollers 310 and across the slide rails 366 and onto the upper surfaces of the lift rails 374, reaching the intermediate workpiece position 152a. The lift rails 374 are then lowered, carrying the workpiece 152a downward with them and into the pallet nest. Shortly before the lift rails 374 reach their fully retracted position, the workpiece 152a is fully nested by the pallet 170. The pallet 170 is now loaded; it is released to be replaced by the next empty pallet 172, and the cycle can repeat with the arrival of a new workpiece 152 on the power roll conveyor 156.

It can be seen that this mechanism must be slightly altered to be used to unload workpieces from the pallets to the roll conveyor. The pusher bar 360 and its actuating cylinder 362 must be mounted on the other side of the intermediate workpiece position 152a and push in the opposite direction, i.e., from right to left. To unload a pallet, the lifter rails 374 move upward lifting a workpiece 152 from a loaded pallet 172; upon reaching their upper position, the revised pusher bar slides the workpiece onto the roll conveyor. Pusher and lifter return, the now empty pallet 172 is released to be replaced by a full pallet 170.

The mechanism of FIGS. 20 and 21 is provided as one example. It can be used with a belt conveyor or a power and free conveyor as well as the power roll conveyor shown. Other methods of loading and unloading pallets will be subsequently described.

When this system is employed for the simple storage of workpieces between two sections of a machine as shown in FIG. 11, no switching of pallets, either full or empty, is required. Switching is defined as the means of optionally routing a pallet moving along a given track to one or more alternate tracks, or as the means for routing pallets moving on two or more individual tracks onto a single track.

When this system is employed to crosstransfer workpieces between parallel processing lines, in addition to storage, or when it is used to divide the workpiece flow from one number of sections of a line to a larger number of following sections of that line, or when it is used to combine the workpiece flow of multiple parallel sections of a line to a smaller number of following sections, some type of switching is required for both the empty pallets and the full pallets.

One type of switching employs the elevators which are already in use. Referring to FIG. 13, a second output for loaded pallets may be added as at 390, or a second input for loaded pallets may be added as at 392. Similarly, and referring to FIG. 14, a second output for empty pallets may be added as at 394, or a second input for empty pallets may be added as at 396. These additions to FIGS. 13 and 14 are for illustrative purposes and it will be understood that the points of addition and the heights at which they occur will be dependent on the specific application.

It can be seen that when multiple inputs or outputs are used for any given elevator flight, the elevator itself can function as a switch and combine the flow from multiple inputs or selectively control the flow to multiple outputs by selection of the gate operations.

Switching may also be performed while the pallets are rolling on their own wheels on a section of fixed track as shown in FIGS. 22 and 23. A section of track 400 is suitably supported by hangers 402 as previously described, with an overhanging portion 404 dependent on its own vertical stiffness for support. A cylinder 406, suitably supported from the track support structure, has its rod end pivot connected to a clevis 408 mounted to the overhanging portion of the track 404. Two other fixed portions of track 410 and 412, which represent the ends of alternate track loops, are also suitably supported from the structure. Each of these tracks 410 and 412 carry stops 414 and 416 respectively which limit the travel of the track portion 404.

As shown in FIG. 22, with the cylinder 406 extended, the track portion 404 is held against stop 414 aligning tracks 400 and 410. When the cylinder 406 is retracted, the track portion 404 is deflected or bent until it reaches stop 416, as at 404a, which aligns track 400 with track 412. It will be noted that the track is relativey unstiff and resilient enough in the horizontal plane to permit the deflection within the elastic limit of the material.

This simple deflection track switch is usable to divide pallet flow or to combine it dependent on the direction of downflow incorporated. Switches using hinge points in lieu of track deflection are also usable. Switches of comparable design may also be incorporated into the roller nest type track, but because of greater complexity are not as favored as flexible fixed track switches.

FIG. 24 shows a track circuit layout for an application in which the flow is divided from the output of a single section of machine 420 and transferred, with storage, to the input of two identical parallel following machine sections 422 and 424. A pallet loader 186 removes workpieces 152 from the last station of machine section 420 and deposits into a waiting empty pallet on the lower track level 426, 428. It will be noted that the last station of the machine internal transfer system is adapted to this operation, and that there is no power roll conveyor. The lower level track is pitched downward from 426 to 428 and the track at the pallet load point is of the roller nest type.

Full pallets 170 enter the elevator 430 at the lower track level 428 from which point they are carried upward to be selectively discharged at one or the other of the two upper level tracks 432 and 434. This selection is made by the two discharge gates on the elevator, and is controlled by the two high level contact switches 436 and 438 which cut off the flow to a given track when that track is sufficiently full to actuate the switch. In the absence of a signal from either high level switch, the loaded pallets may be alternately routed or follow any other appropriate scheduling.

Full pallets 170 entering track 434 join the end of the queue from whose forward end, escapement 440 releases the full pallets one at a time to enter the lowerator portion of elevator 442. They are subsequently discharged at the lower track level 444 to roll by gravity to the stop position 446, at which point they are unloaded by pallet unloader 200. This pallet unloader 200 delivers the workpiece 152 directly to the load station of machine section 424, from which station the internal machine transfer system pulls it directly into the machine. An empty pallet 172 then proceeds to the end of the lower level track 448, enters the elevator portion of elevator 442 to be discharged at the upper level track 450. From this point, an empty pallet rolls by gravity to the end of the queue controlled by escapement 452 at elevator 430.

Full pallets 170 which enter the track 432 follow an analogous path through escapement 454, elevator 456, lower level track 458, 460, to return as empty pallet 172 on upper level track 462, the workpieces 152 having been delivered to machine section 422.

It will be noted that two separate queues of empty pallets 172 controlled by escapements 452 and 464 enter the elevator 430 at the upper track levels. The control of this flow is by gates such as 274 and 396 in FIG. 14. Selection will ordinarily be alternately from each track queue unless a given high level switch 466 or 468, for empty pallets, indicates an excessively long queue, at which time, empty pallets from the queue only will enter the lowerator portion of elevator 430.

Empty pallets from either upper level queue are discharged at the lower level track 426 to be reloaded with a workpiece 152 to begin another travel cycle through one loop or the other.

It will be noted that on the average, the elevators 456 and 442 will cycle only at half the rate as elevator 430. It will be further noted that this system can be inverted, i.e., two machine sections will feed into a single machine section. One way to visualize the situation with respect to FIG. 24 is to reverse the roles of empty and full pallets 172 and 170, to consider the flow from machines 422 and 424 to a single downstream machine 420 and to consider mechanisms 200 as pallet loaders and mechanism 186 as a pallet unloader.

FIG. 25 shows a track layout for two parallel lines, with storage on each given line and the addition of cross flow tracks for crossfeeding of workpieces between lines when conditions warrant.

The normal on-line upper level storage tracks are shown as dotted lines and correspond identically with the tracks so numbered in FIG. 11, when applied to one of the two parallel lines, consisting of machine sections 150 and 154 and conveyor 156.

A second parallel line consisting of machine sections 150*a* and 154*a* and conveyor 156*a* employs on line upper level storage tracks numbered as on the first line except for the suffix "a".

The lower level tracks in FIG. 25 correspond identically with those of FIG. 11 and are numbered as in FIG. 11 for the line 150, 154, and with the suffix "a" for the line 150*a*, 154*a*.

When the lines are operating without crossflow, the storage function and description of each line storage system is as described for FIG. 11.

To achieve crossflow, four additional upper level tracks are added as shown; no changes are required of the lower level tracks 180-182, 194-196 on which the pallets are loaded and unloaded. For crossfeeding full pallets 170 from line 150*a*, 154*a* to line 150, 154, upper level track 480-482 is added from elevator 174*a* to elevator 188. For crossfeeding full pallets 170 from line 150, 154 to line 150*a*, 154*a*, upper level track 484-486 is added from elevator 174 to elevator 188*a*. For returning empty pallets 172 from line 150*a*, 154*a*, to line 150, 154, upper level track 488, 490, is added from elevator 188*a* to elevator 174; and for returning empty pallets from line 150, 154, to line 150*a*, 154*a*, upper level track 492, 494, is added from elevator 188 to elevator 174*a*.

It will be noted that the addition of these four crossflow tracks adds an additional upper level input and upper level output to each of the four combination elevator lowerators 174, 188, 174*a*, and 188*a*. This requires two gates at each such point in place of the one required where only on line storage is required. The control of these gates is again through the use of appropriate queue length-determining limit switches.

In some applications, a slightly different arrangement is preferred; this is shown in FIG. 26. In this embodiment, the lowering function of the elevators is deleted and replaced by sections of helical positioned track which spiral downward from the upper track level to a level suitable for the loading (or unloading) of pallets.

Referring to FIG. 26, which is a schematic representation of a single line storage system, a power roll or equivalent transfer conveyor 500 is employed to transfer workpieces 152 between two sections of a transfer line, as previously described. When workpiece storage is called for by the line requirements, a pallet loader 502 removes workpieces from the conveyor 500 and deposits them one at a time into empty pallets 172 which then become full pallets 170. The empty pallets 172 which are waiting to be loaded are queued and stored on a helical track section 504 which extends from the upper track level to the pallet load level. Loaded pallets 170 roll down a short track section 506 to be picked up by buckets on an elevator 508 which discharges them onto an upper level track 510 on which they progress to the top of a helical storage track 512 used for storing and lowering loaded pallets 170.

When the line requirements call for workpieces to be delivered to the conveyor 500 a pallet unloader 514 unloads the full pallets 170 from the helical storage track 512, one at a time, delivering the workpieces 152 to the conveyor 500 and discharging the now empty pallets 172 to a short track section 516. From here, the empty pallets are picked up by the buckets of an elevator 518 which discharges them on an upper level track 520 on which they progress to the top of the helical storage track 504, completing the total pallet travel loop.

The system described in connection with FIG. 26 is for the storage and delivery of workpieces from and to a single line. It can also be used for crossfeeding between parallel lines, for dividing flow or for recombining flow. Alternate inputs 522 for full pallets 170 can be introduced on the ascending flight of elevator 508 to accept full pallets from adjacent lines or to achieve combining of workpieces from two machine sections; this in turn requires the alternate distribution of empty pallets 172 from the descending flight of elevator 518 as schematically shown at 524.

Similarly, full pallets 170 can be delivered away from the subject line by providing alternate outputs 526 on the descending flight of elevator 508; and this in turn requires the acceptance of empty pallets 172 at the alternate inputs 528 on the ascending flight of elevator 508; this is required for crossfeeding or for dividing flow to a larger number of following machine sections.

As previously described, these alternate inputs and outputs are controlled by gates which respond to the queue lengths at the various pallet waiting points in the system.

While the system described uses two discreet elevators, it is easily seen that both elevators can be combined into a single mechanical unit having buckets capable of simultaneously supporting full pallets and empty pallets as shown in FIGS. 13 and 15. Additionally, the lower level tracks 506 and 516 would need to be routed to be substantially parallel at their entry into such a double elevator.

Each of the previous system embodiments employed a lower level track system and a discrete mechanism for the loading and unloading of the pallets at that level. Additionally, the elevators, and lowering systems operated on the pallets and through them indirectly on the workpieces. In the embodiment of FIGS. 27 and 28, the workpieces themselves are directly elevated from the conveyor, or lowered to it, and the pallet loading and unloading accomplished by this same operation.

Referring to FIGS. 27 and 28, two elevator side plates 540 support two sprocket shafts 542 suitably journalled therein; one of these shafts is driven by an intermittent drive mechanism such as that of my prior U.S. Pat. Nos. 3,789,676; 3,859,862 and 4,075,911, each of which illustrates a drive for producing a mechanically generated acceleration-deceleration movement.

Each of these shafts 542 has mounted on it two sprockets 544 spaced apart on the shafts; these sprockets in turn drive and support two chain loops 546 and 548, with the straight flights of these chains operating in substantially vertical paths. A series of workpiece carriers 550 are pin connected to each chain 546, 548 with nominally equal spacing, and they pivot with respect to the chains to maintain a constant hanging (dependent) attitude. Each carrier is comprised of two cantilevered arms 552, which are contoured to support and maintain location of a workpiece 152, and a structural cross-connections 554 between said arms. A guide roller 556 is mounted on each connecting pin between chains 546, 548 and carriers 550; and the rollers 556 are guided in channel members 558 mounted to the elevator side plates 540. Auxiliary guide rollers 560 are mounted directly to the carriers 550 and also operate in the channel members 558 to prevent free swinging of the carriers 550 during their movement along the vertical paths. The carriers 550 are free to swing as pendulums while traversing the reversing arcs created by the sprockets; suitable bell mouths (not shown) at the ends of the channel members 558 guide the rollers 556 and 560 into the ends of the channels.

The workpieces 152, in traversing from one machine section to the next, progress along a power roll conveyor 156 (FIG. 11) as previously described. This power roll conveyor 156 is adapted to operate with the elevator by incorporating slots 562 (FIG. 28) between the rollers through which the carrier arms 552 are free to pass while delivering workpieces 152 to, or removing them from, the conveyor.

An upper level track (see FIG. 29) carrying full pallets 170 terminates at the elevator with a short section of roller nest track 564; full pallets arriving at this point are held in the position 170a (FIG. 27) by a suitable escapement previously shown. A gate section 566, comprising a short section of roller nest track, is mounted on a shaft 568 actuated by a mechanism as in FIG. 17. This gate 566 leads to a fixed section of curved roller nest track 570 which directs pallets rolling thereon out one side of the elevator. A suitable stop is provided on the gate section 566 to stop a pallet in position 170b.

A second upper level track carrying empty pallets 172 also terminates at the elevator with a short section of roller nest track 572; empty pallets arriving at this point are held in the position 172a by a suitable escapement. After a short gap, a section of roller nest track 574 extends through the elevator and also curves out the side of the elevator (FIGS. 27, 28, 29); and a second stop is provided to halt a pallet in position 172b.

It will be noted that a gap 576 exists between track 564 and gate 566 in its down position; and that a similar gap 578 exists between track 572 and track 574. These gaps are small enough to permit a pallet to confortably bridge as it rolls across, but large enough to permit the carrier structure 554 to pass through vertically. It will further be noted that the carrier arms 552 are spaced further apart than the width of an empty pallet, and therefore, when an empty pallet is positioned as at 172b, or 170b, the empty carriers 550 can move vertically through these positions without interference.

Though it is not inherently necessary to use an indexing motion for the chain elevator, it is very convenient to do so, and further it is most convenient to have the stopped or dwell position of the carriers 550 positioned as shown in FIG. 27, i.e., with the points of pickup or deposition of workpieces 152 to or from the roll conveyor 156 or to or from pallets 170 or 172 approximately midway between the carriers stopped position. This permits operation of the gates to proceed without any interference with adjacent carriers (buckets) or workpieces, and further permits movement of workpieces on the conveyor without interference with the adjacent carriers.

With the points of pickup and deposition of the workpieces midway between the stopping points of a carrier or bucket, it is very advantageous to utilize an index distance or stroke, as generated by the indexing drive and as related to the drive sprocket periphery, which is one-half of the carrier spacing on the chain. In this way, a given carrier will be at or near zero velocity when a workpiece is picked up or deposited by said given carrier at the conveyor or with respect to a pallet. Stated another way, the chain and its carriers move through a double acceleration-deceleration cycle while moving through a distance equal to one carrier pitch on the chain.

Similarly, and to minimize the number of carriers on the total chain length, the carrier pitch distance on the chain can be three, or four, or even more integral multiples of the distance moved by the chain during an acceleration-deceleration cycle created by the aforesaid indexing drive. This is the case provided that the workpiece pickup or deposition point coincides with a carrier position at one of the intermediate momentary stopping points or dwells separating the multiple acceleration-deceleration cycles.

The unloading of workpieces from the full pallets 170 queued on track 564 to the roll conveyor 156 proceeds as follows: the gate 566 is lowered and a full pallet in position 170a is released by the actuation of the appropriate escapement and is permitted to roll down to position 170b where it is again stopped. The sprockets 544 are then indexed counterclockwise through one carrier pitch distance causing the flight of carriers on the left to move downward and the flight of carriers on the right to move upward. The lowermost carrier above the roll conveyor at the start of index deposits the workpiece 152 it was carrying onto the conveyor rollers and proceeds to the next position below the roller conveyor as an empty carrier. Simultaneously, an empty carrier directly below the full pallet in position 170b lifts a workpiece 152 from the full pallet, converting it into an empty pallet 172, and this carrier proceeds to a position directly above gate 566. The now empty pallet on gate 566 is released by the stop and rolls out on track 570 to proceed to the end of the empty pallet queue. The workpiece deposited on the roll conveyor 156 is carried away by the power rolls and the system awaits the next delivery command from the machine requirements. This cycle can be repeated whenever the carrier workpiece deposit position on the roll conveyor is empty and as long as there are full pallets waiting to be unloaded on track 564. After the last full pallet has been emptied at position 170b, those carriers still carrying workpieces 152 can deliver those workpieces to the roll conveyor; and the subsequent arrival of additional full pallets will then require additional cycling to refill the gaps so generated in the workpieces in the carrier, which are above and between the roll conveyor and the pallet unload position.

Whereas workpieces are unloaded from full pallets in position 170b, workpieces are loaded into empty pallets in position 172b. To unload workpieces 152 from the roll conveyor 156 to the empty pallets, the gate 566 is open and full pallets in the queue on track 564 are held back by their escapement. An escapement on the roll conveyor 156 holds a workpiece in a position 152a and the sprockets of the elevator are indexed clockwise a distance equal to one carrier pitch. This causes the left flight of carriers to move upward and the right flight of carriers to move downward. The carrier immediately below the roll conveyor moves through it (opening 562) lifting the workpiece 152 upward with it. At this time, or during a subsequent unload cycle, depending on the initial condition of the intermediate carriers, the carrier immediately above the empty pallet at 172b, in moving downward during a clockwise conveyor unload cycle, will, if it is carrying a workpiece, deposit that workpiece into the waiting empty pallet in position 172b. As soon as a workpiece is received by an empty pallet, it becomes a full pallet, and is released by the stop and rolls out on track 574. The first empty pallet in the queue on track 572 in position 572a is then released by its controlling escapement and stopped again in position 172b. It will be noted that the presence of an empty pallet in position 172b may exist even during pallet unloading at position 170b, since there is no interference between rising empty carriers moving upward past an empty pallet in this position.

The operation of this system may be summarized as follows:

1. To deliver workpieces to the conveyor 156, the sprockets 544 index counterclockwise one carrier pitch.
2. To remove workpieces from the conveyor 156, the sprockets 544 index clockwise one carrier pitch.
3. Prior to a delivery cycle, the gate 566 is lowered and a full pallet (if available) is allowed to move to position 170b to be emptied as part of a delivery cycle.
4. After a delivery cycle, the now empty pallet in position 170b is released to move out on track 570.
5. After a removal cycle, if the pallet in position 172b was loaded with a workpiece, the now full pallet is released to move out on track 574, and is immediately replaced with an empty pallet from position 172a.

It can be seen that if no empty pallets are available at position 172b, and if the carrier immediately above track 574 is carrying a workpiece, the storage system has absorbed its full complement of workpieces and no more removal of workpieces from conveyor 156 is permitted. Similarly, if no full pallets are available at position 170a and if the carriers between position 170b and the roller conveyor 156 are empty, the storage system has delivered its full complement of workpieces and no additional deliveries can be made.

It will be noted that full pallets emerge from the elevator on track 574 and reappear at the track 564 which is higher. Referring to FIG. 29, a track plan schematic, a pallet elevator 580 for full pallets must be added to the track loop which begins at track 574 and ends at 564, in order to compensate for the difference in elevation between the ends of the track plus the height lost due to the downward slope of the track. This elevator which is termed a booster elevator may be of a design comparable to the design of the elevator described in connection with FIGS. 12-15 except that the buckets need carry only full pallets and the elevator is proportionally narrower. In the simple non-switching application of FIG. 29, no gates are required and a single low level input for full pallets arriving on track 574, and a single high level output for full pallets discharging onto track 564 is sufficient.

Since empty pallets emerge on track 570 which is higher than track 572, the requirement for an empty pallet elevator, shown in dashed lines as 582 is dependent on each application, specifically on the height differential between tracks 570 and 572 and the length of track between them which in turn is dependent on the desired empty pallet storage\capacity. If these requirements demand the usage of an empty pallet elevator, its construction would be similar to that for full pallets, except for lift height. Furthermore, if the physical track routing permits, the full pallet elevator 580 and empty pallet elevator, when required, can be combined into a single elevator as in FIG. 15.

A variation of the bare parts loading and unloading elevator of FIG. 27, which is possible, and in some cases desirable, may be achieved by combining the position of pallet unloading and the position of pallet loading into a single position on the elevator. Tracks 564 and 570 and gate 566 are deleted; a combining track switch, such as in FIGS. 22 and 23 is added ahead of track section 572 and is used to select empty or full pallets from their respective waiting queues, and a second dividing track switch, such as in FIGS. 22 and 23, is added to track 574 to direct empty or full pallets to their respective tracks.

In this way, empty or full pallets can be positioned at 172b, and this single position is utilized either to load or unload the respective pallets, according to the demands of the main line.

The foregoing description of a pallet loader-unloader built in the form of an elevator applies to its use with substantially conventional power roll conveyor which exist between machine sections. The same mechanisms with only minor modifications can be used directly between machine sections in the absence of the power roll conveyor.

FIG. 30 shows a schematic track and system layout for the transfer and storage of workpieces directly from the last station of machine section 150 to the first station of machine section 154. A bare part elevator 584 is used to elevate the bare unpallitized workpieces from the last station of machine section 150, into which a workpiece is transferred by the internal machine transfer system; this last station is suitably adapted with slots for the carriers of the elevator unloader 584 to move through in lifting a workpiece vertically out of this station. The elevator 584 is substantially identical with the elevator of FIGS. 27 and 28 except that the full pallet entry track 564, gate 566, and empty pallet exit track 574 are deleted, and the elevator indexing is always clockwise, to remove workpieces from the last station of the machine section 150 and to load them into empty pallets at position 172b.

After the now full pallets 170 leave the elevator 584 on track 574, they progress to a pallet elevator 580, (or booster elevator), and then to the end of the queue awaiting entry into elevator 586, whose function it is to unload full pallets 172 and deliver the workpieces into the first station of machine section 154. Elevator 586 is also substantial identical with the elevator of FIGS. 27 and 28, except that the empty pallet entry track 572 and full pallet exit track 574 are deleted and that the elevator indexing is always counterclockwise to remove workpieces from full pallets at position 170b and deliver them to the first station of machine section 154. Since the requirement to lower full carriers 550 downward through position 170b no longer exists, it is further possible to delete the gate 566 and make that portion of the roller nest track integral with exit track 570. Empty pallets are discharged to track 570 to roll by gravity to the end of the empty pallet queue awaiting entry into elevator 584, with or without going through an empty pallet booster elevator 582, depending on the fall available, and, distance between exit track 570 on elevator 586 and entry track 572 on elevator 584. Furthermore, since the entry and exit tracks on each elevator 584 and 586 are no longer related as they must be on a single elevator, it is possible to arrange these heights to delete the booster elevator 580 for full pallets and use only a booster elevator 582 for empty pallets. The first station of machine section 154 is slotted to permit the vertical downward motion of a carrier 550 as it deposits a workpiece into this station. From this deposit position, the workpiece is transferred into the machine directly by the machine internal transfer system.

While the track and system schematic layouts of FIGS. 29 and 30 apply only to single lines, as between machine sections 150 and 154, it is also possible to adapt this pallet loader or unloader as a bare part elevator technique to crossfeeding between multiple parallel lines as previously illustrated in FIG. 25. Indeed, greater system design flexibility exists. Full or empty pallets can be switched, not only by track switches, or by the use of gates in the pallet (booster) elevators, as has been previously described, but such switching can now also be accomplished by adding additional entry tracks, exit tracks, and movable gates to the bare part elevators, whose primary function is the loading and unloading of pallets as in FIGS. 27 and 28 and elevators 584 and 586 in FIG. 30.

FIG. 31 illustrates a track and system schematic layout for a situation in which the workpieces from a single machine section 150 are divided and delivered to two following machine sections 154 which is analagous to the system of FIG. 24. A bare part elevator 588 lifts workpieces vertically upward from the last station of machine 150 which is again adapted for this operation. The elevator 588 is again substantially identical with the elevator of FIGS. 27 and 28, except that the indexing is always clockwise to unload workpieces from the last station of machine 150. However, in this application of a bare parts unloader elevator, tracks 564 and 570 and gate 566 are not deleted but used as an alternate position for loading empty pallets. Empty pallets are queued on track 564 as well as on track 572 and the loading of an empty pallet can occur at either position 170b or 172b, and full pallets can exit at tracks 570 or 574.

Tracks 570 and 574 proceed to two entry points of a pallet booster elevator 584 from which two exit tracks 586 and 588 route full pallets to the respective queues leading to the two elevators 586, each of which unloads workpieces from full pallets and delivers them to the first station of its associated machine section 154 as previously described. The empty pallets discharged from the two pallet unloaders 586 proceed on downward sloping tracks to the two empty pallet queues 587a and 587b associated with pallet loader elevator 588.

No booster elevator for empty pallets is shown in FIG. 31. If one were used, it could operate with a single output and two inputs, thereby combining the empty pallets from the two unloaders 586, and deleting the multiple input function of elevator pallet loader 588. Numerous other arrangements are possible, with any given choice dependent on the specific parameters of a given situation.

The technique of FIG. 31 for the division of workpiece flow, can, with obvious modifications, be used for the combination of workpiece flow, and, with other modifications, be used for crossfeeding between multiple lines. In essence, the use of an elevator type pallet loader or unloader does not decrease the system options but increases them.

For workpieces such as cylinder heads, crankshafts, cam shafts, and comparable parts distinguished by a relatively large ratio of length to width, pallets which incorporate a hanger structure at each end to operate on a fixed overhead track through flanged retarded wheels are appropriate. For other types of workpieces, pallets which mount their own retarded support wheels, to operate on a fixed track, on the underside of said pallets are more appropriate.

In either case, and depending on workpiece size and configuration, it may be advantageous for a given pallet to locate and support two or more workpieces, with all elements of the system adapted to handle such a condition.

An illustrative construction of the underside of a pallet to ride over a fixed track, as opposed to hanging from it, is shown in FIGS. 32–36. It will be understood that the upper surface of the pallet, not shown, is contoured to support and locate the specific workpiece or workpieces for which it was designed. Referring to FIGS. 32–34, a pallet body 600 has mounted on its underside two cartridge type retarder assemblies 602 which support double flanged wheels 604 having multiple rolling diameters. The wheels 604 roll on and are guided by a stationary track 606 (FIG. 33) intermittently supported by a structural support member 608. It will be understood that the track 606 will have a slight downslope in the direction the pallets rolling thereon are intended to travel.

Since the center of gravity of the pallet, with or without the workpiece it carries, will normally be above the contact points between wheels 604 and track 606, the pallet is unstable and will tend to tilt one way or the other about the said contact points. Therefore, two auxiliary wheels 610 are mounted on pallet base 600 to roll on auxiliary tracks 612 which are suitably structurally interconnected with the structure member 608. It will be noted that the contact surfaces of the auxiliary tracks 612 are horizontal so lateral alignment in the horizontal plane can be imprecise. Vertical alignment is also very non-critical, provided only that tracks 612 as shown in FIG. 33 do not both become high enough to lift the pallet off the primary track 606.

In normal construction, both tracks 612 will be mounted some reasonable distance below their theoretical position for simultaneous contact with both wheels 610. It is of no concern that the pallet 600 tilt through some reasonable angle before stability is regained through contact of one wheel 610 or the other with its associated track 612; furthermore, it is of no concern that the pallet tilt back and forth between the two limits established by tracks 612.

In FIG. 33, the location of auxiliary tracks 612 is under the auxiliary wheels 610. As shown in the inset of FIG. 35, it is also possible to locate the auxiliary tracks 614 above the auxiliary wheels 610, it being understood that both tracks must be above or both tracks below the auxiliary wheels 610. The arrangement of FIG. 35 is advantageous in that it is least susceptible to dirt pickup.

In some areas of pallet travel, especially as pallets move through switches of the type shown in FIGS. 22 and 23, it is desirable to provide stability through only one or the other of wheels 610. Such an arrangement is shown in FIG. 36. In this case, a single wheel 610 is trapped between an upper and a lower rolling surface as in a channel member 616.

The methods of providing stability, through wheels 610, as illustrated in FIGS. 33, 35 and 36, may be alternated on a given track section to suit specific conditions.

The underside of the pallet body 600 is designed to incorporate longitudinal strips of substantially flat surfaces which are intended to support the pallet in such areas where it operates on roller nest type track, or for support in bucket type pallet elevators. Two center guide rollers 618 are mounted on the underside of the pallet body, operating on vertical axes, to provide lateral guidance on the center channel of a typical roller nest type track.

At the four corners of the pallet body 600 are mounted four adapters 620, which are intended to operate with pins on a specialized type of elevator to be described. These adapters 620 are in effect inverted U type structures suitable for mating with stub pins on an elevator chain. It will be understood that these adapters 620 can also be incorporated in the pallets employing overhead wheels and hangers.

All embodiments of pallet elevators already described employ buckets which are pivot-suspended from the two chain loops to lift pallets from one level to another. An elevator for lifting pallets without the use of buckets is illustrated in FIGS. 37 and 38. Two side frames 630 are interconnected by spacers 632. Two lower shafts 634 and 636 are suitably journalled in the sideframes 630; and each of the shafts mount two sprockets 638. The two lower shafts 634 and 636 are interconnected to rotate in the same direction by sprockets 640, mounted thereon, and chain 642. Four upper sprockets 644 are mounted on stub shafts 646 which are journalled in the sideframes 630. It will be noted that the upper sprocket shafts 646 do not span the distance between the two sideframes 630, but that the sprockets 644 are mounted on the short cantilever shafts 646 and that the interspace between the upper sprockets is open for the passage of pallets. Two chain loops 648 operate between the lower sprockets 638 mounted on shaft 634 and their corresponding upper sprockets 644; two other chain loops 650 operate between the lower sprockets 638 mounted on shaft 636 and their corresponding upper sprockets 644. All four chain loops rotate in unison as driven by an indexing drive, as previously noted, by one or the other of the interconnected lower shafts 634 or 636.

On each of the four chain loops 648 and 650 are mounted a series of pins 652, which may be simple extensions of the hinge pins of the chain, or short stub pins otherwise connected to the chains. For a given position of all four chain loops, and for a given position of a given pin on one chain, the other three chains on their corresponding flights will carry pins which lie substantially in the same horizontal plane as the given pin. Then as the sprockets are rotated in unison, such a set of four pins, one mounted to each chain loop, will continue to lie in a substantially horizontal plane, which moves as the chains move. This coplaniarity of a set of four pins remains true, even as the pins traverse the peripheries of the upper sprockets 644 or lower sprockets 638.

A short section of roller nest track 654 is suitably mounted between the chain loops 648 and through one flight of chain loops 650; this is the entry point for pallets to be elevated. A stop 655 is mounted at the end of this track 654 to halt a pallet in the proper position for pickup by the pins 652. Similarly, a short section of roller nest track 656 is mounted to the frame 630, and extends not quite through the chain loops 650; this track 656 is used to carry away the pallets after they have been elevated.

To elevate the pallets, all sprockets rotate clockwise as viewed in FIG. 38. A pallet 658 is released by an escapement on the input track 654, and allowed to roll down against stop 655. In this position, the adapter receptacles 620 on the pallet are in alignment with the paths of the four pins mounted on the chains 648 and 650. To accomplish a lift cycle, the sprockets rotate clockwise through one pin pitch. The pins on the ascending flights of chain loops 648 and 650, i.e., the left hand vertical flights as viewed in FIG. 38, engage the adapters 620 on the pallet 658, and lift it vertically upward from track 654.

The pallets 658, shown in FIG. 38, are shown in an intermediate position after the pallet 658 has been lifted from the track 654. Near the end of the index, the leading pallet 658, which has been carried over the top of the sprockets 644, always moving parallel to itself, now moves downward on the descending flights of the chain loops 648 and 650, i.e., the right hand flights as viewed in FIG. 38. This downward movement causes the pallet 658 to be stripped from the pins 652 by the roller track 656, on which the pallet 658 rolls away. It will be noted that the descending pins on the chain loop 648 clear the body of the pallets 658 still moving up on the pins of the ascending chain flights since they clear the adapters 620 which extend beyond the basic body outline.

Pallets intended for use with an elevator of the type shown in FIGS. 37 and 38 must incorporate adapters as illustrated by the adapters 620 in FIGS. 32–34, and such adapters can be added to the previous pallet embodiments shown.

Furthermore, while the adapters on the pallets are shown as inverted "U's" to be engaged by pins on the chain, it is equally feasible to make the adapters as pins on the pallets, while the chain is fitted with U fittings to engage those pallet adapter pins. Indeed, it is possible to devise a variety of male-female combinations of pallet adapters and corresponding chain fittings to accomplish the desired chain to pallet engagement.

Another embodiment of an elevator suitable for elevating pallets is shown in FIGS. 39 and 40. This is again a four chain loop elevator, but in this embodiment, two chain loops rotate in one direction, while the other two chain loops rotate in the other direction.

Two sideframes 660 are interconnected by spacers 662. Two lower shafts 664 and 666 are suitably journalled in sideframes 660; and each has mounted on it two sprockets 668 and 670, respectively. These shafts 664 and 666 are suitably interconnected to rotate in opposite directions and are again driven by an indexing drive system as previously noted. Two upper shafts 672 are also journalled in sideframes 660, and each in turn supports two sprockets 674. Four chain loops operate between the upper and lower sprockets; two chain loops 676 operate between lower sprockets 668 and the corresponding upper sprockets 674, and two chain loops 678 operate between lower sprockets 670 and the corresponding upper sprockets 674.

At substantially equal intervals of their total loop lengths, the chains of chain loops 676 have angular lift brackets 680 transversely suspended between the two chain loops. Similarly, a group of identical lift brackets 682 is suspended between the chain loops 678.

A section of roller nest track 684, suitably mounted to the frames 660 extends between the chain loops 676 and 678, and a stop 686 is attached to the end thereof. A pivoted gate 688, comprised of roller nest track, is mounted to a shaft 690 which is rotated as in FIG. 17. With the gate in its extended position, shown in dashed lines, it is substantially coplanar with a section of fixed roller nest track 692 suitably connected to the frame 660. With the gate 688 in its returned position as shown in solid lines in FIG. 39, it does not interfere with pallets being elevated.

A pallet 694 enters the elevator of track 684 to be halted by stop 686 in proper position to be picked up and elevated by a bracket 680 on chain loops 676 and a corresponding bracket 682 on chain loops 678. It will be noted that to elevate a pallet 694, the sprockets 668 rotate counterclockwise and sprockets 670 rotate clockwise, through equal peripheral increments. At the end of a given elevating index of the chain loops 676 and 678, a pallet 694 reaches the uppermost position on the elevator. At the end of the index, the gate 688 is extended, slightly lifting said pallet 694, whereupon it rolls out onto track section 692.

All of the elevating methods previously described employ elevators in which the pallets are lifted through a substantially vertical path. The height differential or head is required only to supply the gravitational energy to the system to create the movement of the pallets along the unpowered, downsloping tracks, and this height differential can also be created by sloping, rather than vertical, elevators which will be termed pallet escalators.

A side view of a generalized pallet escalator is shown in FIG. 41. A pulley 700 is mounted on a shaft 702 suitably journalled in a frame of conventional construction; at the other end of the escalator, a similar pulley 704 is mounted on a shaft 706, also suitably journalled in the same frame. Either shaft 702 or shaft 706 or both are driven in a clockwise direction by an appropriate drive system.

Referring also to an illustrative cross-section in FIG. 42, two belts 708 encircle the pulleys 700 and 704; these belts 708 are supported in their upper flight by a plate 710, also mounted to the frame, on which they slide. Two fixed rails 712 are mounted to this plate 710 to form a channel for guiding the center guide rollers of a typical pallet.

A section of fixed track 714 converts to a short section of roller nest track 716 which abuts the belts at an obtuse angle. At the other end of the escalator, another short section of roller nest track 718 is tangential to the belt on pulley 704 and then converts to the beginning of the fixed track 720. It can be seen that a pallet 722 moving down track 714 on its own retarded wheels will transfer to the roller nest track 716 on which it rolls until its leading lower edge contacts the upward moving belts 708. Friction between the belts and the bottom of the pallet will carry the pallet up the inclined surface until it is stripped off by the roller nest 718, on which it rolls downward to return to a fixed track 720 at a higher level than at 714. During its movement on the tracks 716 and 718 and belts 708, the pallet 722 is guided by its center guide rollers between channels 712.

The belts 708 may be of any suitable formable material with a smooth or ribbed surface, or even a fiber material. The belt may also be a metal chain or belt with or without protuberances to increase friction.

An alternate escalator cross-section is shown in FIG. 43. In this embodiment, two series of rollers 724 are mounted on the upper surface of the plate 710 between strips 711, which in effect create a substantially continuous section of roller nest track. At the uphill section of this track, the pallets are pushed up the slope by two chains 726 having extended pins engaging appropriate protuberances 728 on the pallets 722 comparable to the adapters 620 previously described. The chains 726 are supported by rails 730 and spacers 732 from plate 710.

Another embodiment of escalation which drives the pallets uphill on the fixed track is shown in FIGS. 44 and 45. In this instance, a conventional monorail 740, monorail chain 742, and monorail hanger 744 having supporting rollers 745 is employed to provide the uphill drive for a pallet on its fixed track. A pusher pawl 746 is pivoted to the underside of monorail hanger 744 and maintained in a driving position by a spring 748. The monorail track becomes suitably tangent to the fixed track at the beginning of an upslope, at which time a pusher pawl randomly engages a pallet hanger 8 or 8a, as previously illustrated in FIGS. 1, 2, 5 and 6, and through it drives a pallet 2, up the slope of a rail 14 until the desired height is reached, at which time the fixed track supporting the pallet curves downward to its normal unpowered slope.

It can be seen that this type of escalating pusher can also be adapted to pushing on the underside of the pallet in such applications where this is advantageous.

Another means of achieving pallet escalation is through a series of closely spaced power driven rolls comparable to the power roll conveyor used for the unpalletized workpieces as shown at 156 in FIGS. 20 and 28. Such an escalating power roll conveyor for pallets would obviously require rolls wide enough to accommodate the width of the pallet support surface, and spaced closely enough to provide a continuously stable support for this same surface.

All of the previously described systems for pallet escalation are equally usable for the horizontal transport of pallets, as is sometimes desirable for manual operations on the workpieces, including manual loading and unloading.

Another means of causing a pallet to move along an upslope is shown in FIG. 46, which also illustrates a cylindrical type of retarder as opposed to a disc type of retarder.

A chain strand 750 operates over two sprockets 752, which are arranged comparably to the pulleys 700 and 704 in FIG. 41. The chain strand 750, therefore, is moved upward at an inclined angle as is belt 708 in FIG. 41; a back-up bar, as 710, may be provided to prevent chain sag over long spans.

Referring to FIG. 46, a sprocket 754 is concentrically mounted to the wheel 60 mounted on shaft 756 of a cylindrical type cartridge retarder, which is comprised of housing 758, bearings 760 and 762, seal 764, and a rotor 766 mounted on the shaft 756. The interspace between the housing 758 and the rotor 766 is filled with a viscous fluid creating a cylindrical shear area 768 between the rotor 766 and housing 758. This cylindrical cartridge retarder also creates a torque proportional to the angular velocity of shaft 756.

The housing 758 is connected to the pallet by a hanger 8a and hook 50 as in FIGS. 5-8; or it may be configured with a mounting boss 770 making it usable with an undersupported pallet as in FIG. 33.

For downslope operation, the pallet rolls on one of the rolling diameters of wheel 60 as previously described. For upslope operation, the track brings the pallet into line with the chain strand 750 and the sprocket 754 finds its way into engagement with the chain 750; it will be noted that a double strand chain is used, with one strand engaging the driving sprockets 752 and the other strand engaged by the pallet sprocket 754, thereby precluding sprocket-to-sprocket interference.

As the chain 750 is driven uphill, it drives the sprocket 754 with it; this sprocket 754 may rotate with respect to the housing 758 with the aforementioned torque speed ratio. The retarder now functions as a slip clutch. It can be seen that as the sprocket 754 is pulled uphill by the chain 750, the pallet rolls backwards with respect to the upward moving chain as determined by the retarder characteristics. The true pallet uphill velocity will be less than that of the chain. As a good approximation, the pallet rolls backward at a relative velocity with respect to the chain as if it were rolling downhill at that same angle of inclination, and in order to achieve a given upward velocity of the pallet, the total chain velocity must be the sum of this relative velocity and the given net upward velocity.

This technique is useful for moderate upward inclination angles comparable to or somewhat greater than the downhill angles at which the pallet rolls on the tracks, and for which the retarder was designed. This is caused by the fact that the retarder torque angular velocity ratio is the same in both directions of rotation. It can be seen that the retarder torque is generated by one direction of rotation of the shaft 756 when the pallet is moving downhill, and generated by the opposite direction of rotation of the shaft 756 when the pallet is being moved uphill by the chain 750.

An illustrative means of building a retarder which has a given torque angular velocity ratio when the shaft is rotated in one direction, and a higher torque angular velocity ratio when the shaft is rotated in the opposite direction, is shown in FIG. 47, which comprises an addended section of FIG. 46.

Referring to FIG. 47, the housing 758a and shaft 756a are lengthened to create additional space adjacent to the rotor 766 mounted on shaft 756a and bearing 760. A secondary rotor 772 is journalled on the shaft 756a through bushings 774. Additionally, the secondary rotor 772 is connected to the shaft 756a through an overrunning clutch 775, such as a sprag clutch or a roller clutch; such clutches are characterized by permitting free rotation of the shaft 756a with respect to the rotor 772 for one direction of shaft 756a rotation with respect to the rotor 772, and locking the rotor 772 to the shaft 756a for the opposite direction of rotation.

It can be seen, therefore, that for one direction of rotation of the shaft 756a, the retarding torque is generated by shear of the fluid between rotor 766 and housing 758a, with rotor 772 disconnected from shaft 756a, while for the other direction of rotation of the shaft 756a, the retarding torque is generated by the shear of the fluid between both rotors 766 and 772 and the housing 758a. Stated another way, the torque angular velocity ratio is greater for one direction of rotation of shaft 756a than for the other direction of its rotation.

This construction can be usefully employed by arranging these characteristics such that only rotor 766 rotates to create the retarding torque during the downhill movement of a pallet, and both rotors 766 and 772 rotate during the uphill pulling of chain 750. The higher torque angular velocity ratio created by the retarder during this uphill pulling permits steeper uphill inclination for a given amount of slippage. It will be understood that this type of double rotor construction is equally applicable to the disc type retarder shown in FIGS. 2 and 5 by using multiple discs, including concentric discs, one of which is attached to the shaft through an overrunning clutch.

Another method for pulling the pallets uphill through the use of the retarder shaft is shown in FIG. 48. Two pulleys 780 are mounted in an arrangement such as pulleys 700 and 704 in FIG. 41. A belt 782 is driven by pulleys 780 at an inclined angle such as belt 708 in FIG. 41. The belt 782, shown in section in FIG. 48, is configured to run over the pulleys 780 and also to engage one of the diameters of wheel 60 on retarder 758. Therefore, as the belt 780 moves uphill, the pallet is also pulled uphill at a lower velocity, due to the slippage of the retarder, analagously to the chain sprocket system of FIG. 46.

The systems for moving pallets uphill at inclined angles through the retarder, with its attendent slippage, is useful in that it is a simple and inexpensive method of lifting pallets through moderate distances while still retaining the non-jamming characteristics of the simple downhill track. Pallets may even form part of a queue on the chain or belt without harmful consequences.

The technique of moving the pallet through the retarder by a chain and sprocket as in FIG. 46 or by a belt on the existing wheel as in FIG. 48, is also applicable for horizontal travel of the pallets. In such a case, the sprockets 752 or pulleys 780 are arranged horizontally. This is useful for situations where manual loading and unloading of the pallets is desired or where some manual operation is to be performed on the workpiece.

Another outgrowth of this technique is that in situations where downhill angles of travel are required that exceed the friction capacity of the wheel on a track of the type shown in FIGS. 5 and 7, it is feasible to incorporate a fixed section of chain to be engaged by the sprocket 754, it being understood that this fixed chain would be mounted parallel to the track and in proper relationship to the track to be engaged by sprocket 754 when wheel 60 is on or slightly above the track. The wheel to track friction would be of no consequence because of the positive chain to sprocket engagement for retardation.

Similarly, in such steeper downhill applications, a fixed section of belt, suitably supported, could be used as a track, it being understood that the wheel belt holding friction is greater than the wheel track friction of FIG. 5.

Another useful technique is illustrated in FIGS. 49 and 50. In this instance, a secondary wheel 786 is mounted to the shaft 756 through a bearing 788. This wheel engages an auxiliary track 790 mounted parallel to the modified primary track 64a on modified supports 72a. It can be seen that when a pallet is supported by wheel 786 rolling on auxiliary track 790, the retarding torque of the retarder 758 is effectively cancelled since the wheel 786 is free to rotate on bearing 788. This is a means of turning off the retarding effect as a pallet rolls down some portion of the inclined track. It is usefully employed going around sharp corners which create a natural retarding effect, or for moving away from a stopped position, such as at an escapement, where minimum departure time is desirable, or wherever a nonretarded situation is desirable.

Also illustrated in FIG. 49 is a capping member 792 mounted on the modified primary track 64a. This capping member 792, which may be bolted to track 64a or merely pressed over it, accomplishes two functions; it is an expendable wear member which is easily and economically replaced, and it can create two angular contact lines with the wheel 60, thus increasing the wheel to track effective contact force.

The crossover from a situation in which a pallet is rolling on the unretarded wheel 786 on track 790 to the situation in which that pallet in rolling on the retarded wheel 60 on track 64a with capping member 792 requires no moving parts other than the pallet movement itself as it rolls downhill.

Referring to FIG. 50, wheel 786 is shown rolling on track 790 and rolling downward to the right. As both wheels continue to the right, as a pair, the wheel 60 contacts its track 64a, 792, at a point 794 and rolling thereon is established. Simultaneously, wheel 786 lifts from track 790; track 790 tapers off slightly, then terminates completely.

It can be seen that the capping member 792 is not relevant to this track shift other than to provide a replaceable wear surface on track 64a, i.e., the track shift could also be accomplished with an uncapped track such as shown by 64 in FIG. 5.

It can also be seen that the shift from the retarded rolling of wheel 60 on track 64 to the unretarded rolling of wheel 786 on track 790 can be accomplished by adding another segment of track 790 provided with a tapered entry which is the inverse of the configuration shown in FIG. 50.

Several means for transferring workpieces from the line to the pallets and then from the pallets back to the line have already been described. Another technique suitable for certain workpiece configurations involves moving a pallet directly through the on-line station, where an empty pallet is moved vertically upward through the station to pick up a workpiece, or a full pallet is lowered through the station to deliver a workpiece.

FIGS. 51 and 52 illustrate this technique as it relates to movement of a pallet which is being moved vertically in a chain type elevator of the type illustrated in FIGS. 27 and 28, with the exception that the buckets are designed to carry pallets as opposed to bare workpieces.

Referring to FIGS. 51 and 52, the workpiece 152 is shown in position at the point of interchange; it is supported on the interrupted slide rails 800 and 802. It will be understood that these rails 800 and 802 are part of the main line transfer system and that the workpiece 152 reaches the position shown by being pushed into this position by a machine transfer bar or by an auxiliary transfer bar. It will be further noted that the gap between rails 800 and 802 is sufficiently small for the workpiece to bridge as it is slid across in the direction of arrow 804.

A pallet 806 is supported by an elevator bucket 808 which in turn is guided by rollers 556 and 560 in elevator channels 558 and carried by chains 546 and 548 as detailed in FIGS. 26 and 27. Referring to FIGS. 51 and 52, it will be noted that the pallet 806 is configured to vertically pass through the gap between the rails 800 and 802; the elevator bucket 808 is similarly configured to pass through this same gap. It will be further noted that the pallet 806 overhangs the bucket sufficiently to be capable of being lifted from the bucket by a fixed track or swinging gate of the roller nest type, not having the center guide (which is of no consequence for a short distance).

For the loading of workpieces into the pallets, it will be understood that empty pallets are loaded into the elevator and full pallets discharged therefrom by tracks and gates as previously described. The elevator buckets 808 carry empty pallets 806 upward through the main line rails 800 and 802, thereby loading a workpiece into a pallet. With the pallet 806 and bucket 808 clear of the now empty interchange position, the elevator stops. The main line transfer system now slides the next workpiece 152 into the interchange position and another elevator index takes place raising the next empty pallet on its bucket through the interchange and it now becomes loaded.

The transfer of workpieces 152 from the pallets to the main line transfer involves exactly the inverse operations. Full pallets are loaded into the elevator and empty pallets discharged therefrom by tracks and gates as previously described. Full pallets are lowered by the elevator through the interchange position whereby the workpieces 152 are deposited on the rails 800 and 802. After each such deposition, a workpiece is carried away by the main line transfer bar.

Separate elevators can be used for pallet loading and unloading, or by the combining of tracks and gates, a single elevator can be used for both pallet loading and unloading by change of direction.

A variation of the technique of moving the pallet through the main line slide rails 800, 802 is illustrated in FIG. 53. In this instance, a vertically reciprocating actuator, rather than a chain type elevator, is employed. Referring to FIG. 53, an empty pallet rolls down fixed track 812 to be deposited on roller nest track 814 where it is stopped in the position, shown at 806, by a stop 816.

A workpiece 152 is brought into the interchange position on slide rails 800 and 802 as described before. An elevator platform 818 is mounted on an actuator 820 which is comprised of a cylinder, or equivalent, and appropriate guide rods, slides or equivalent (not shown), through which the platform 818 is moved through the necessary vertical stroke. As the platform 818 is raised by the actuator 802, it passes between the two series of rollers of the roller nest track 814 and contacts and lifts the empty pallet 806. After a short further lift, the pallet 806 reaches the position 806a at which point the pallet 806 contacts and lifts the workpiece 152 from the rails 800, 802. The upward movement of the platform 818 continues until the pallet it is carrying, now loaded, reaches the full up position shown as 806b. With the pallet held in this position by the fully extended actuator 820 and platform 818, a roller nest gate 822 is pivoted to position 822a by a torque tube 824 actuated as described in connection with FIG. 17. The roller nest track is split to clear the platform 818 and its rollers contact the underside of the loaded pallet at 806b. The actuator 820 and platform 818 return to their lowermost position as shown, and the loaded pallet in position 806b rolls downward to the right on the roller nest track 822a and 826 and makes contact with fixed track 830 on which it is carried away into the trackage system. Finally, the roller nest gate is returned to its position 822 and the mechanism is ready for the next cycle. The supporting structure for the various elements is not shown but is of simple conventional design.

The same technique is usable for unloading full pallets. The inclination of tracks 812, 814, 826, 830 and 822a and platform 818 are reversed, i.e., they slope downward to the left instead of to the right. A full pallet now rolls down to position 806b (though oppositely inclined) from tracks 830 and 826 on roller nest track 822 in position 822a (again oppositely inclined). The platform 818 is lifted to a position under pallet 806b by actuator 820; the roller nest track swings to position 822, and the platform 818 lowers the full pallet. When position 806a is reached, the workpiece 152 is deposited on the slide rails 800, 802 and the now empty pallet and platform 818 continues downward. Near the end of the downstroke, the roller nest track 814 strips the empty pallet from the platform 818, and the empty pallet rolls away on fixed track 812. The roller nests 822 return to position 822a to await the arrival of the next full pallet. The workpiece 152 is carried away on slide rails 800, 802 and the mechanism is ready for its next cycle.

Specification Summary

As can be seen from the foregoing drawings and descriptions of the various embodiments and combinations, the essential elements of this workpiece transfer and storage system are:

A. A group of substantially identical pallets, each of which:
   1. Locates and supports the workpiece or workpieces to be stored or transferred;
   2. Moves downhill on a fixed track on its own wheels which guide on the track, at least one of which is speed governed, and optionally capable of being governed at differing speeds by selection of different rolling diameters on these wheels;
   3. Can also move downhill on a track consisting of a group of rollers whose upper surfaces constitute a plane or helical surface with the rollers spaced closely enough to support the pallet in a stable manner. This requires a suitable surface on the underside of the pallets, and suitable guide rollers to guide itself with respect to such a roller track;
   4. Can be elevated on a conventional type bucket elevator, or with special adapters be elevated by a nonbucket elevator.
B. A powered type elevating system or systems which can elevate vertically, or escalate at an upward angle, full pallets or empty pallets, including escalating systems which utilize the fixed or roller nest type track.
C. One composite topological closed loop track, approximately half for full pallets, and the remainder for empty pallets, which is comprised of: a fixed track on which the pallets roll on a downward slope on their own, self guided and speed governed wheels; a roller bed track on which the pallets roll on track rollers contacting substantially flat surfaces on the pallets; and elevating or escalating systems suitably situated in the overall composite track loop.
D. Pallet loader and unloader systems which transfer workpieces into and out of the pallets, including loaders and unloaders which elevate and lower the workpieces in elevators and thereby eliminate at least a portion of the pallet elevators required in their absence. It will be understood that the loaders and unloaders divide the composite topological closed loop track into a portion for empty pallets and a portion for full pallets.
E. Where crossfeeding between multiple parallel lines is required, or where workpiece flow division on a single line is required, or where workpiece flow combining on a single line is required, the provision of track switches, where such switches are in the fixed track, roller track, or as multiple exit and entry tracks on the elevators.

It will be appreciated that the pallet carrying means, namely, the track means, forms a topological closed loop, and this term is used in the claims to define the loop. This loop may include rising and descending portions such as elevators and lowerators and various lifting and lowering mechanisms and portions of the loop may overlie each other. Topologically, however, the loop or loops are closed and include segments for loaded pallets and segments for unloaded pallets.

We claim:
1. In a series of automatic workpiece processing equipment, including individual machines, transfer machines, or individual sections of transfer machines which sequentially operate on a workpiece, thereby constituting a processing line, a gravity actuated workpiece transfer and storage system, comprising:

A. track means forming a topologically closed loop comprising a first track means having track surfaces which slope downwardly in a given topological direction around said loop, B. a plurality of workpiece holding pallets, each of which comprises:
1. a body adapted for supporting and holding one or more workpieces which is appropriate to said workpiece size,
2. two unpowered primary wheels of different diameters mounted on said pallet body for selectively supporting and guiding said pallet body on and with respect to said first track means,
3. retarding means acting between said pallet body and each of said primary wheels to generate a retarding torque substantially proportional to the angular velocity of said first primary wheel, C. lifting means positioned between segments of said track means and within said topological closed loop, and adapted to raise said pallet bodies sequentially from a lower level segment of said track means to a higher level segment of said track means, D. means for loading and unloading workpieces to and from said pallet bodies comprising a pallet body loading mechanism forming a first division which divides said track means into two portions: a first portion for carrying empty pallet bodies and a second portion for carrying pallet bodies loaded with workpieces, and a pallet body unloading mechanism which forms a second division between said second portion and said first portion of said track means, and E. said first and second portions of said track means being spatially related relative to said primary wheels to cause the smaller diameter primary wheel to ride on said second portion of said track means when a pallet body is loaded with a workpiece, and to cause the larger diameter primary wheel to ride on said first portion of said track when a pallet body is not loaded with a workpiece, thereby creating a different ratio of retarding force to pallet body velocity for a pallet body supported on one of said primary wheels than the ratio of retarding force to pallet body velocity for a pallet body supported on the other of said primary wheels.

2. In a series of automatic workpiece processing equipment, including individual machines, transfer machines, or individual sections of transfer machines which sequentially operate on a workpiece, thereby constituting a processing line, a gravity actuated workpiece transfer and storage system, comprising:

A. track means forming a topologically closed loop comprising inclined track surfaces which slope downwardly in a given topological direction around said loop, B. a plurality of workpiece holding pallets, each of which comprises:
1. a body adapted for supporting and holding one or more workpieces which is appropriate to said workpiece size,
2. a plurality of unpowered axially spaced primary wheels of different diameters mounted coaxially on a common axis for selectively supporting and guiding said pallet body on and with respect to said track surfaces,
3. retarding means acting between said pallet body and said primary wheels to generate a retarding torque substantially proportional to the angular velocity of each said primary wheel as it moves on an inclined track surface, C. lifting means positioned between segments of said track means and within said topological closed loop, and adapted to raise said pallet bodies sequentially from a lower level segment of said track means to a higher level segment of said track means, D. means for loading and unloading workpieces to and from said pallet bodies, comprising a pallet body loading mechanism forming a first division which divides said track means into two portions: a first portion for carrying empty pallet bodies and a second portion for carrying pallet bodies loaded with workpieces; and a pallet body unloading mechanism which forms a second division between said second portion and said first portion of said track means, and E. said first and second portions of said track means being spatially related relative to said primary wheels to cause the smaller of said primary wheels to ride on the second portion of said track means when a pallet body is carrying a workpiece, and the larger of said primary wheels to ride on the first portion of said track means when a pallet body is not carrying a workpiece, thereby creating a larger ratio of retarding force to pallet body velocity for a pallet body carrying a workpiece, than the retarding force to pallet body velocity for a pallet body not carrying a workpiece.

3. In a series of automatic workpiece processing equipment, including individual machines, transfer machines, or individual sections of transfer machines which sequentially operate on a workpiece, thereby constituting a processing line, a gravity actuated workpiece transfer and storage system, comprising:

A. track means forming a topologically closed loop comprising inclined track surfaces which slope downwardly in a given topological direction around said loop, B. a plurality of workpiece holding pallets, each of which comprises:
1. a body adapted for supporting and holding one or more workpieces which is appropriate to said workpiece size,
2. a plurality of unpowered axially spaced primary wheels of different diameters mounted coaxially on a common axis for selectively supporting and guiding said pallet body on and with respect to said track surfaces,
3. retarding means acting between said pallet body and said primary wheels to generate a retarding torque substantially proportional to the angular velocity of each said primary wheel as it moves on an inclined track surface, C. lifting means positioned between segments of said track means and within said topological closed loop, and adapted to raise said pallet bodies sequentially from a lower level segment of said track means to a higher level segment of said track means, D. means for loading and unloading workpieces to and from said pallet bodies, comprising a pallet body loading mechanism forming a first division which divides said track means into two portions: a first portion for carrying empty pallet bodies and a second portion for carrying pallet bodies loaded with workpieces; and a pallet body unloading mechanism which forms a second division between said second portion and said first portion of said track means, and E. said first and second portions of said track means being laterally positioned relative to said primary wheels at said loaders, unloaders and lifting means wherein said smaller of said primary wheels engages the second portion of said track means when a pallet body is carrying a workpiece, and said larger of said primary wheels engages the first portion of said track means when a pallet body is not carrying a workpiece, thereby creating a larger ratio of retarding force to pallet body velocity for a pallet body carrying a workpiece, than the ratio of retarding force to pallet body velocity for a pallet body not carrying a workpiece.

4. In a series of automatic workpiece processing equipment, including individual machines, transfer machines, or individual sections of transfer machines which sequentially operate on a workpiece, thereby constituting a processing line, a gravity actuated workpiece transfer and storage system, comprising:

A. track means forming a topologically closed loop comprising inclined track surfaces which slope downwardly in a given topological direction around said loop, B. a plurality of workpiece holding pallets, each of which comprises:
  1. a body adapted for supporting and holding one or more workpieces which is appropriate to said workpiece size,
  2. a plurality of unpowered primary wheels of different diameters mounted for selectively supporting and guiding said pallet body on and with respect to said track surfaces,
  3. retarding means acting between said pallet body and said primary wheels to generate a retarding torque substantially proportional to the angular velocity of each said primary wheel as it moves on an inclined track surface, C. lifting means positioned between segments of said track means and within said topological closed loop, and adapted to raise said pallet bodies sequentially from a lower level segment of said track means to a higher level segment of said track means, D. means for loading and unloading workpieces to and from said pallet bodies, comprising a pallet body loading mechanism forming a first division which divides said track means into two portions: a first portion for carrying empty pallet bodies and a second portion for carrying pallet bodies loaded with workpieces; and a pallet body unloading mechanism which forms a second division between said second portion and said first portion of said track means, and E. said first and second track portions having different widths to form a wider section and a narrow section, and said wheels having coaxial large and small diameter portions on each side of the centerplane of the wheels, the large diameter portions being spaced to engage the wider track sections for carrying unloaded pallets and the small diameter portions being spaced to engage the narrow track sections for carrying loaded pallets, thereby creating a larger ratio of retarding force to pallet body velocity for a pallet body carrying a workpiece, than the ratio of retarding force to pallet body velocity for a pallet body not carrying a workpiece, F. said track portions being positioned at said loaders, unloaders and lifting means wherein said larger diameter portions of said wheels engage said wider track sections to receive and carry unloaded pallets, and said smaller diameter portions of said wheels engage the narrow track sections to receive and carry loaded pallets.

5. In a series of automatic workpiece processing equipment, including individual machines, transfer machines, or individual sections of transfer machines which sequentially operate on a workpiece, thereby constituting a processing line, a gravity actuated workpiece transfer and storage system, comprising:

A. track means forming a topologically closed loop comprising a first track means having track surfaces which slope downwardly in a given topological direction around said loop and at least one auxiliary track portion positioned along said closed loop, B. a plurality of workpiece holding pallets, each of which comprises:
  1. a body adapted for supporting and holding one or more workpieces which is appropriate to said workpiece size,
  2. two unpowered primary wheels of different diameters mounted on said pallet body for selectively supporting and guiding said pallet body on and with respect to said first track means,
  3. retarding means acting between said pallet body and each of said primary wheels to generate a retarding torque substantially proportional to the angular velocity of said first primary wheel,
  4. a secondary wheel mounted by free wheeling bearings on said pallet body, C. lifting means positioned between segments of said track means and within said topological closed loop, and adapted to raise said pallet bodies sequentially from a lower level segment of said track means to a higher level segment of said track means, D. means for loading and unloading workpieces to and from said pallet bodies comprising a pallet body loading mechanism forming a first division which divides said track means into two portions: a first portion for carrying empty pallet bodies and a second poertion for carrying pallet bodies loaded with workpieces, and a pallet body unloading mechanism which forms a second division between said second portion and said first portion of said track means, and E. said first and second portions of said track means being spatially related relative to said primary wheels to cause the smaller diameter primary wheel to ride on said second portion of said track means when a pallet body is loaded with a workpiece, and to cause the larger diameter primary wheel to ride on said first portion of said track when a pallet body is not loaded with a workpiece, thereby creating a different ratio of retarding force to pallet body velocity for a pallet body supported on one of said primary wheels than the ratio of retarding force to pallet body velocity for a pallet body supported on the other of said primary wheels F. said auxiliary track portion engages said secondary wheel to support the pallets in a free-wheeling manner whereby the primary wheels do not engage said first track means.

* * * * *